US011251871B2

(12) United States Patent
Fu et al.

(10) Patent No.: US 11,251,871 B2
(45) Date of Patent: Feb. 15, 2022

(54) METHOD AND APPARATUS FOR DETERMINING MAXIMUM GAIN OF RAMAN FIBER AMPLIFIER

(71) Applicant: ACCELINK TECHNOLOGIES CO., LTD., Wuhan (CN)

(72) Inventors: Chengpeng Fu, Hubei (CN); Jintao Tao, Hubei (CN); Menghui Le, Hubei (CN); Cuihong Zhang, Hubei (CN); Di Fang, Hubei (CN); Qinlian Bu, Hubei (CN); Chunpin Yu, Hubei (CN); Fei Liu, Hubei (CN); Peng Zhang, Hubei (CN)

(73) Assignee: ACCELINK TECHNOLOGIES CO., LTD., Hubei (CN)

( * ) Notice: Subject to any disclaimer, the term of this patent is extended or adjusted under 35 U.S.C. 154(b) by 495 days.

(21) Appl. No.: 16/224,729

(22) Filed: Dec. 18, 2018

(65) Prior Publication Data

US 2020/0007238 A1 Jan. 2, 2020

(30) Foreign Application Priority Data

Jun. 27, 2018 (CN) .......................... 201810680595.8

(51) Int. Cl.
*H04B 10/291* (2013.01)
*H01S 3/067* (2006.01)
*H01S 3/30* (2006.01)
*H04B 10/294* (2013.01)
*H04B 10/071* (2013.01)
*H01S 3/13* (2006.01)

(52) U.S. Cl.
CPC ..... *H04B 10/2916* (2013.01); *H01S 3/06754* (2013.01); *H01S 3/1301* (2013.01); *H01S 3/302* (2013.01); *H04B 10/294* (2013.01); *H01S 2301/02* (2013.01); *H01S 2301/04* (2013.01); *H04B 10/071* (2013.01)

(58) Field of Classification Search
None
See application file for complete search history.

(56) References Cited

U.S. PATENT DOCUMENTS 6,519,082 B2 * 2/2003 Ghera ................ H04B 10/2916
359/334
7,391,559 B2 * 6/2008 Eiselt ...................... H01S 3/302
359/334

(Continued)

FOREIGN PATENT DOCUMENTS

CN 102749783 A 10/2012
CN 108649416 A 11/2018

(Continued)

OTHER PUBLICATIONS

Toge et al., "Design method for distributed raman amplification systems based on statistical properties in optical fibers." IEICE transactions on communications 88, No. 3 (2005): 1066-1071.

(Continued)

*Primary Examiner* — Eric L Bolda
(74) *Attorney, Agent, or Firm* — Vierra Magen Marcus LLP

(57) ABSTRACT

The present disclosure relates to a technical field of optical communication, and provides a method and an apparatus for determining maximum gain of Raman fiber amplifier. Wherein the method includes obtaining transmission performance parameters of a current optical fiber transmission line; respectively obtaining impact factors $A_1$, $A_2$, $A_4$ according to a distance between a joint and a pump source, a fiber loss coefficient, and a fiber length included in the transmission performance parameters; calculating a joint loss value $Att_{Aeff}$ according to a distance between a joint and a pump source, a fiber loss coefficient, and looking up (Continued)

impact factor $A_3$ according to $Att_{Aeff}$; determining an actual maximum gain which may actually be achieved by the Raman fiber amplifier according to $A_1$, $A_2$, $A_3$, $A_4$. The actual maximum gain obtained in the present disclosure is the maximum gain that may be achieved over all input power ranges, and the original signal in system is kept to operate at a fixed gain, such that a gain locking effect is realized, and fluctuation of existing transmission signal power caused by signal change in transmission fiber link is avoided.

18 Claims, 11 Drawing Sheets

(56) References Cited

U.S. PATENT DOCUMENTS

| | | | | |
|---|---|---|---|---|
| 8,681,419 | B2* | 3/2014 | Onaka | H01S 3/13013 359/334 |
| 9,640,941 | B2* | 5/2017 | Hochhalter | H01S 3/10015 |
| 2004/0042068 | A1* | 3/2004 | Eiselt | H04B 10/2916 359/344 |
| 2015/0253217 | A1* | 9/2015 | Gurusami | H01S 3/094076 356/73.1 |

FOREIGN PATENT DOCUMENTS

| | | |
|---|---|---|
| CN | 108833033 A | 11/2018 |
| CN | 108964753 A | 12/2018 |
| EP | 3588810 A1 | 1/2020 |

OTHER PUBLICATIONS

EP 18214843.7-1220—Extended European Search Report dated Aug. 28, 2019, 8 pages.

\* cited by examiner

METHOD AND APPARATUS FOR DETERMINING MAXIMUM GAIN OF RAMAN FIBER AMPLIFIER

TECHNICAL FIELD OF THE DISCLOSURE

The present disclosure relates to a technical field of optical communication, and particularly to a method and an apparatus for determining maximum gain of Raman fiber amplifier.

BACKGROUND

Raman fiber amplifier is an important portion of high-speed, long distance fiber communication system. With "Internet+" being established as a national strategy, development of mobile Internet, cloud computing, big data, and Internet of Things puts forward higher demands on bandwidth and speed of existing communication networks, and main factor restricting large-scale application of highspeed and ultra-long distance communication system is Optical Signal Noise Ratio (OSNR), Raman fiber amplifier has unique advantages in improving OSNR of the system, and its low noise coefficient property may significantly reduce the degradation speed of Optical Signal Noise Ratio in the fiber communication system, which is of great significance for extending transmission distance, expanding cross-segment spacing, and reducing system cost, etc.

Chinese patent CN201110174019.4 disclosed a method for performing gain control by using out-of-band ASE, wherein linear relationship between out-of-band Amplified Spontaneous Emission (ASE) and gain is disclosed, meanwhile, the relationship of correction to ASE in a case of different input power is disclosed, however, the control method is still easily influenced by performance of transmission line, and the performance of transmission line includes, for example, a fiber length of transmission, a loss coefficient of fiber and a joint loss in transmission line.

Chinese patent CN200810154431.8 disclosed a method for calculating in-band ASE power by using out-of-band ASE power, wherein a method for detecting linear relationship between in-band ASE power and out-of-band ASE is disclosed, and this method is very helpful for gain control of distributed Raman fiber amplifiers.

Chinese patent CN201210235491.9 disclosed a method for calculating joint loss by using out-of-band ASE power. This method has been applied to a certain extent, however, this method may not distinguish total joint loss value Point-loss caused by fiber loss coefficient, mode field diameter or fiber effective area and fixed attenuation point.

U.S. Pat. No. 8,643,941 disclosed a method for performing gain control by using out-of-band ASE, wherein a method for calculating gain by subtracting input power from output power is disclosed, this method comprises detecting out-of-band ASE power and total signal power, calculating in-band ASE power by using a linear relationship between out-of-band ASE and in-band ASE, then obtaining amplified pure signal power. In this way, this method may be realized during the control process by setting target signal power as the target gain adding the signal power before the Raman pump laser is turned on. This method is similar to gain control of EDFA, wherein pump proportion and gain satisfy linear relationship during control process. This method may be applied only in a case of a certain gain tilt and a fiber length exceeds a certain length, further, this method still cannot overcome the influence of transmission line performance including, for example, a transmitted fiber length, a loss coefficient of fiber and a joint loss in transmission line.

U.S. Pat. No. 6,519,082 disclosed a method for controlling a distributed Raman fiber amplifier integrated with an optical time domain reflectometer (OTDR), disclosing a method for calculating Raman gain coefficient by using a transmission line loss, a joint loss, a fiber length and a fiber dispersion detected by the OTDR in real time. In the method, a pump power configuration table of each pump is built in an amplifier in a case of different gains, and Raman gain and gain tilt control are realized by detecting each channel power at output terminal of Raman fiber amplifier or total power in each sub bandwidth. In this method, the detection of fiber loss in real time by the OTDR is greatly affected by Raman gain, calculation of the Raman gain coefficient also need solve the differential equation, and data processing raises a higher requirement on control unit, the time will be very long due to complicated calculation process, the built-in table is greatly affected by environmental factors, and enormous tables need to be built to adapt to all situations, and requirement for hardware cost is high.

on account of this, it is an urgent problem to be solved in the art to overcome this defect existing in the prior art.

SUMMARY

The technical problem to be solved in the embodiments of the present disclosure is as follows:

The prior art lacks an effective method to obtain a maximum gain on which a Raman fiber amplifier may be locked.

In a first aspect, the present disclosure provides a method for determining a maximum gain of a Raman fiber amplifier, wherein a relationship between the maximum Raman gain and a 0 km joint loss $Att_{point[i]}$ equivalent to a joint loss at different positions of one or more types of fibers, a relationship between the maximum Raman gain and a 0 km joint loss $Att_{coefficient[j]}$ equivalent to a joint loss caused by a loss coefficient of the fibers, a relationship between the maximum Raman gain and a 0 km joint loss $Att_{Aeff[k]}$ equivalent to a joint loss caused by a mode field diameter of the fibers, and a relationship between the maximum Raman gain and a fiber length are pre-configured, where i is a distance from a joint to a pump source, j is the loss coefficient of the fibers, and k is the mode field diameter of the fibers, the method comprises:

obtaining transmission performance parameters of a current optical fiber transmission line, the transmission performance parameters including a distance between the joint and the pump source, a fiber loss coefficient, and a fiber length;

looking up the relationship between the maximum Raman gain and the joint loss $Att_{point[i]}$, the relationship between the maximum Raman gain and the joint loss $Att_{coefficient[j]}$, and the relationship between the maximum Raman gain and the fiber length according to the distance between the joint and the pump source, the fiber loss coefficient, and the fiber length included in the transmission performance parameters to obtain a maximum gain impact factor $A_1$, a maximum gain impact factor $A_2$, and a maximum gain impact factor $A_4$, respectively;

calculating a 0 km joint loss $Att_{Aeff}$ equivalent to a joint loss caused by the mode field diameter of the fiber in the current fiber transmission line according to the distance between the joint and the pump source and the fiber loss coefficient, and looking up the relationship between the maximum Raman gain and the joint loss $Att_{point[k]}$ according to the joint loss $Att_{Aeff}$ to obtain a maximum gain impact factor $A_3$;

determining the maximum gain $G_{max\_factual}$ which the Raman fiber amplifier can actually achieve according to the impact factors $A_1$, $A_2$, $A_3$, and $A_4$.

Preferably, calculating a 0 km joint loss $Att_{Aeff}$ equivalent to a joint loss caused by the mode field diameter of the fiber in the current fiber transmission line according to the distance between the joint and the pump source and the fiber loss coefficient, and looking up the relationship between the maximum Raman gain and the joint loss $Att_{point[k]}$ according to the joint loss $Att_{Aeff}$ to obtain a maximum gain impact factor $A_3$, further comprises:

obtaining a 0 km-equivalent joint loss $Att_{point}$ according to the distance between the joint and the pump source, and obtaining a 0 km-equivalent joint loss $Att_{coefficient}$ according to the fiber loss coefficient;

obtaining a total joint loss Pointloss of the transmission line by using out-of-band ASE, the total joint loss Pointloss being also recorded as $Att_{Total}$;

calculating a 0 km-equivalent joint loss $Att_{Aeff}$ caused by the mode field diameter in the current fiber transmission line according to $Att_{Aeff} = Att_{Total} - Att_{point} - Att_{coefficient}$, and looking up the relationship between the maximum Raman gain and the joint loss $Att_{Aeff[k]}$ according to the joint loss $Att_{Aeff}$ to obtain the maximum gain impact factor $A_3$.

Preferably, obtaining a total joint loss Pointloss of the transmission line by using out-of-band ASE, further comprises:

obtaining out-of-band ASE power $ASE_{out-of-band}$, and calculating the total joint loss Pointloss according to a formula $Att_{total} = (ASE_{out-of-band} - k*P_{pump} - b)/(k+1)$, where $ASE_{out-of-band}$ is detected out-of-band ASE power, $P_{pump}$ is pump power for calculating the joint loss, $Att_{Toal}$ is the total joint loss, k is a tilt factor of the linear relationship, and b is an intercept of the straight line.

Preferably, the relationship between the maximum Raman gain and the joint loss $Att_{point[i]}$, the relationship between the maximum Raman gain and the joint loss $Att_{coefficient[j]}$, and the relationship between the maximum Raman gain and the joint loss $Att_{Aeff[l]}$, further comprises:

calculating an actual maximum gain value according to each loss value $Att_{point[i]}$, and dividing the actual maximum gain value by a calibrated maximum gain value to obtain a corresponding impact factor; establishing a relationship between each loss value $Att_{point[i]}$ and the corresponding impact factor;

calculating an actual maximum gain value according to each loss value $Att_{coefficient[j]}$, and dividing the actual maximum gain value by the calibrated maximum gain value to obtain a corresponding impact factor; establishing a relationship between each loss value $Att_{coefficient[j]}$ and the corresponding impact factor; and calculating an actual maximum gain value according to each loss value $Att_{Aeff[l]}$, and dividing the actual maximum gain value by the calibrated maximum gain value to obtain a corresponding impact factor; establishing a relationship between each loss value $Att_{Aeff[l]}$ and the corresponding impact factor.

Preferably, determining the maximum gain $G_{max\_factual}$ which the Raman fiber amplifier can actually achieve according to the impact factors $A_1$, $A_2$, $A_3$, and $A_4$, further comprises:

calculating an equivalent impact factor A by a formula $A = A_1*A_2*A_3*A_4$ according to the impact factors $A_1$, $A_2$, $A_3$ and $A_4$;

calculating the actual maximum gain value $G_{max\_factual}$ according to a formula $G_{max\_factual} = G_{max\_calibration}*A$, where $G_{max\_calibration}$ is a calibrated maximum gain of the Raman fiber amplifier.

Preferably, when the Raman fiber amplifier is a distributed Raman fiber amplifier, the calibrated maximum gain $G_{max\_calibration}$ is obtained by the following steps:

establishing a relational expression between a gain tilt and the maximum gain through collecting maximum gain values of the Raman fiber amplifier under various gain tilts in advance;

looking up the relational expression between a gain tilt and the maximum gain according to the gain tilt of the current fiber transmisstion line to obtain the calibrated maximum gain $G_{max\_calibration}$.

Preferably, establishing a relational expression between a gain tilt and the maximum gain comprises:

when $Tilt < Tilt_{turning\ point}$, $$G_{max\_calibration} = k_{01}*Tilt + b_{01};$$

when $Tilt \geq Tilt_{turning\ point}$, $$G_{max\_calibration} = k_{02}*Tilt + b_{02};\ and$$

looking up the relational expression between a gain tilt and the maximum gain according to the gain tilt of the current fiber transmission line to obtain the calibrated maximum gain $G_{max\_calibration}$, further comprises:

calculating the calibrated maximum gain $G_{max\_calibration}$ by substituting a Tilt setting value into a corresponding formula of the above two formulas.

Preferably, the 0 km joint loss $Att_{point[i]}$ equivalent to a joint loss at different positions of one or more types of fibers, further comprises:

the value $Att_{point}$ is obtained by establishing in a control unit a table of 0 km-equivalent joint loss varying with a position in the fibers and then obtaining a 0 km-equivalent joint loss value for a position in the fiber by looking up the table and interpolation.

Preferably, the 0 km joint loss $Att_{coefficient[j]}$ equivalent to a joint loss caused by a loss coefficient of the fibers, further comprises:

the value $Att_{coefficient}$ is obtained by establishing in a control unit a table of 0 km-equivalent joint loss varying with a calibrated loss coefficient of the fibers and then obtaining a 0 km-equivalent joint loss value for a fiber loss coefficient by looking up the table and interpolation.

In a second aspect, the present disclosure further provides a method for automatic gain control of Raman fiber amplifier to obtain an actual maximum gain $G_{max\_factual}$ that the current amplifier can actually achieve, comprising:

calculating signal power $P_{signal}$ by using a linear relationship among out-of-band ASE optical power $ASE_{out-of-band}$, in-band ASE optical power $ASE_{in-band}$ and a gain tilt Tilt;

obtaining a compensation gain $\Delta G$ of the Raman fiber amplifier according to the signal power $P_{signal}$ and stable signal power $P_{INU}$ that becomes stable before a Raman pump laser is turned on;

performing a gain control on the Raman fiber amplifier according to the compensation gain $\Delta G$, a setting gain $G_{setting}$, and the actual maximum gain $G_{max\_factual}$ that the current amplifier can actually achieve.

Preferably, performing a gain control on the Raman fiber amplifier according to the compensation gain $\Delta G$, a setting gain $G_{setting}$, and the actual maximum gain $G_{max\_factual}$ that the current amplifier can actually achieve, further comprises:

determining an operating gain $G_{operation}$ based on comparison between the actual maximum gain $G_{max\_factual}$ and the setting gain $G_{setting}$, wherein if the setting gain $G_{setting}$ is less than the actual maximum gain $G_{max\_factual}$, the operating gain $G_{operation}$ is set as the setting gain $G_{setting}+\Delta G$; if the setting gain $G_{setting}$ is larger than the actual maximum gain $G_{max\_factual}$, and $\Delta G$ is a positive value, the operating gain $G_{operation}$ is set as the actual maximum gain $G_{max\_factual}$ that can be actually achieved; if the setting gain $G_{setting}$ is larger than the actual maximum gain $G_{max\_factual}$, and $\Delta G$ is a negative value, the operating gain $G_{operation}$ is set as the actual maximum gain $G_{max\_factual}+\Delta G$.

Preferably, obtaining a compensation gain $\Delta G$ of the Raman fiber amplifier according to the signal power $P_{signal}$ and stable signal power $P_{INU}$ that becomes stable before a Raman pump laser is turned on, further comprises:

obtaining a current actual gain $G_{factual}$ of the Raman fiber amplifier by subtracting the stable signal power $P_{INU}$ that becomes stable before a Raman pump laser is turned on from the signal power $P_{signal}$;

then determining the compensation gain $\Delta G$ of the Raman fiber amplifier as $\Delta G = G_{operation} - G_{factual}$.

Preferably, the Raman fiber amplifier is a single Raman pump fiber amplifier or a distributed Raman pump fiber amplifier.

Preferably, when the Raman fiber amplifier is a single Raman pump fiber amplifier, the operating gain $G_{operation}$ being set as the setting gain $G_{setting}+\Delta G$ or the maximum gain $G_{max\_factual}+\Delta G$, further comprises:

calculating a gain tilt according to a first relational expression between the out-of-band ASE $ASE_{out\text{-}of\text{-}band}$ and the operating gain $G_{operation}$: $ASE_{out\text{-}of\text{-}band}+\Delta ASE = k_1 * G_{operation} + b_1 + Att_{point}$, where $k_1$ is a tilt factor of the linear relationship between the out-of-band ASE power and the gain, $k_2$ is a tilt factor of the linear relationship between the out-of-band ASE power and the gain tilt, and $b_1$ is an intercept; the $k_1$, $k_2$ and $b_1$ are obtained by calibration, $\Delta ASE$ is an ASE correction quantity associated with a fiber length;

adjusting the Raman fiber amplifier according to the calculated out-of-band ASE $ASE_{out\text{-}of\text{-}band}$ so that the detected out-of-band ASE power differs from the calculated out-of-band ASE $ASE_{out\text{-}of\text{-}band}$ less than a preset distance.

Preferably, when the Raman fiber amplifier is the distributed Raman pump fiber amplifier, the operating gain $G_{operation}$ being set as the setting gain $G_{setting}+\Delta G$ or the maximum gain $G_{max\_factual}+\Delta G$, further comprises:

calculating a gain tilt according to a first relational expression between the out-of-band ASE $ASE_{out\text{-}of\text{-}band}$ and the operating gain $G_{operation}$: $ASE_{out\text{-}of\text{-}band}+\Delta ASE = k_1 * G_{operation} + k_2 * Tilt + b_1 + Att_{point}$, where $k_1$ is a tilt factor of a linear relationship between the out-of-band ASE power and the gain, $k_2$ is a tilt factor of the linear relationship between the out-of-band ASE power and the gain tilt, and $b_1$ is an intercept; the $k_1$, $k_2$ and $b_1$ are obtained by calibration, $\Delta ASE$ is an ASE correction quantity associated with a fiber length;

calculating operating power $p_1$ of a pump laser group 1 and operating power $p_2$ of a pump laser group 2 according to the gain tilt calculated according to the first relational expression, the operating gain $G_{operation}$, and a second relational expression; where the second relational expression is: $p_1/p_2 = k_3 * G_{operation} + k_4 * Tilt + b_2$;

where $p_1$ is output power of the pump laser group 1, $p_2$ is output power of the pump laser group 2, $k_3$ is a tilt factor in a linear relationship with the amplifier gain $G_{operation}$, and $k_4$ is a tilt factor in a linear relationship with the gain tilt Tilt, $b_2$ is an intercept, and $k_3$, $k_4$ and $b_2$ are all obtained through calibration;

adjusting an operating state of distributed Raman pump lasers based on the operating power $p_1$ of the pump laser group 1 and the operating power $p_2$ of the pump laser group 2.

Preferably, calculating signal power $P_{signal}$ by using a linear relationship among out-of-band ASE optical power $ASE_{out\text{-}of\text{-}band}$, in-band ASE optical power $ASE_{in\text{-}band}$ and a gain tilt Tilt, further comprises:

$$ASE_{in\text{-}band} = k_5 * ASE_{out\text{-}of\text{-}band} + k_6 * Tilt + (k_5-1)* Att_{point} + b$$

$$P_{signal} = 10*\log_{10}(P_{total} - 10^{\wedge}(ASE_{in\text{-}band}/10))$$

where $P_{total}$ is detected total power of the in-band optical signal, $k_5$ is a proportional coefficient of the linear relationship, $k_6$ is an impact factor of different gain tilts on the original in-band and out-of-band relationship, and b is an intercept.

Preferably, when $\Delta G = G_{operation} - G_{factual}$ exceeds a gain accuracy control requirement, $\Delta G + G_{factual}$ is set as a new gain $G_{operation}$ control quantity to perform iterative calculation, thereby realizing a feedback control.

Preferably, the value $Att_{point}$ is obtained by establishing in a control unit a table of 0 km-equivalent joint loss varying with a position in the fiber and then obtaining a 0 km-equivalent joint loss value for a position in the fiber by looking up the table and interpolation.

In a third aspect, the present disclosure also provides a method for determining a 0 km-equivalent joint loss of a fiber node in a Raman fiber amplifier, comprising:

obtaining a pump transmission power relational expression, a signal transmission power relational expression, and an out-of-band ASE power relational expression;

dividing a fiber into one or two segments according to a position of a joint loss in the fiber; wherein when the position of the joint loss is at the starting point of the fiber, the fiber assumes one segment; when the starting point of the fiber is different from the joint loss position by a preset distance, the fiber assumes two segments, and the joint loss position is taken as the demarcation point of the two segments of the fiber;

If the fiber assumes one segment, respective power variables in the pump transmission power relational expression, the signal transmission power relational expression and the out-of-band ASE power relational expression for the first segment of the fiber being weighted by a weighting value $$10^{\frac{pointloss}{10}},$$

solving the out-of-band ASE power value; and substituting the out-of-band ASE power value into a relational expression between the out-of-band ASE power and a 0 km-equivalent joint loss to obtain the 0 km-equivalent joint loss;

If the fiber assumes two segments, respective power variables in the pump transmission power relational expression, the signal transmission power relational expression and the out-of-band ASE power relational expression for the first segment of the fiber being weighted by a weighting value $$10^{\frac{pointloss}{10}},$$

and respective power variables for the second segment being weighted by a weighting value that is a product of a final value of the power variables in the first segment multiplying $$10^{\frac{pointloss}{10}};$$

solving the out-of-band ASE power value according to the weighted relational expressions of the first and second segments; and substituting the out-of-band ASE power value into the relational expression between the out-of-band ASE power and the 0 km-equivalent joint loss to obtain the 0 km-equivalent joint loss.

Preferably, the relational expression between the out-of-band ASE power and the 0 km-equivalent joint loss is as follows: Pointloss=(ASE$_{out-of-band}$−k*P$_{pump}$−b)/(k+1), where k is a tilt of the linear relationship, b is an intercept of the straight line.

Preferably, solving the relational expression between the out-of-band ASE power and the 0 km-equivalent joint loss, further comprises:

for a selected pump laser pump1, calculating out-of-band ASE detection values corresponding to respective output power values of the pump1 when the joint loss Pointloss is 0, solving parameters k and b in the formula 0=ASE$_{out-of-band}$−k*P$_{pump}$−b according to the out-of-band ASE detection values corresponding to respective output power values, then presenting the joint loss as Pointloss=(ASE$_{out-of-band}$−k*P$_{pump}$−b)/(k+1).

Preferably, a fiber attenuation coefficient in the pump transmission power relational expression, the signal transmission power relational expression and the out-of-band ASE power relational expression is set as a calibration value; and a corresponding fiber length is set to be larger than 100 km.

Preferably, solving the out-of-band ASE power value further comprises:

reforming the weighted pump transmission power relational expression, the weighted signal transmission power relational expression and the weighted out-of-band ASE power relational expression into a format that is supported by a numerical method of ordinary differential equation in Matlab;

calculating a numerical solution of the differential equation by a fourth-order Runge-Kutta algorithm or a boundary value method in Matlab.

Preferably, the pump transmission power relational expression further comprises:

a first pump light transmission power relational expression:

$$\frac{dP_0(z)}{dz} = \alpha_0 P_0(z) + \sum_{k=1}^{n} \frac{g_{0k}}{A_{eff}} P_0(z) P_k(z),$$

where $\alpha_0$ is a transmission loss of a wavelength corresponding to the pump $$P_0, \frac{g_{0k}}{A_{eff}}$$

is a Raman gain coefficient from the pump $P_0$ to the pump or signal $P_k$, a second pump light transmission power relational expression:

$$\frac{dP_i(z)}{dz} = \alpha_i P_i(z) - \sum_{j=0}^{i-1} \frac{g_{ji}}{A_{eff}} P_i(z) P_j(z) + \sum_{k=i+1}^{n} \frac{g_{ik}}{A_{eff}} P_i(z) P_k(z),$$

where $\alpha_i$ is a transmission loss of a wavelength corresponding to the pump $$P_i, \frac{g_{ji}}{A_{eff}}$$

is a gain coefficient between the pump $P_i$ and the pump $$P_j, \frac{g_{ik}}{A_{eff}}$$

is a gain coefficient between the pump $P_i$ and the pump or signal $P_k$;

weighting the power variables in the pump light transmission power relational expressions by a weighting value $$10^{\frac{pointloss}{10}}$$

comprising replacing the variables $P_0(Z)$ and $P_i(Z)$ on a right side of the first and second pump light transmission power relational expressions by $$P_0(z) \times 10^{\frac{Pointloss}{10}} \text{ and } P_i(z) \times 10^{\frac{Pointloss}{10}},$$

respectively.

Preferably, the signal transmission power relational expression further comprises:

$$\frac{dP_n(z)}{dz} = -\alpha_n P_n(z) + \sum_{j=0}^{n-1} \frac{g_{jn}}{A_{eff}} P_n(z) P_j(z),$$

where $\alpha_n$ is an attenuation coefficient of the n-th signal wavelength $$\frac{g_{jn}}{A_{eff}}$$

is a gain coefficient between the j-th pump and the n-th signal, $P_n$ is power of the n-th signal, $P_j(z)$ is power of the j-th signal or pump with a wavelength less than the n-th signal wavelength;

weighting the power variable in the signal transmission power relational expression by a weighting value $$10^{\frac{pointloss}{10}}$$

comprising replacing the variable $P_n(Z)$ on a right side of the signal transmission power relational expression by $$P_n(z) \times 10^{\frac{Pointloss}{10}}.$$

Preferably, the out-of-band ASE power relational expression further comprises:

$$\frac{dP_{ASE}(z)}{dz} = -\alpha_{ASE} P_{ASE}(z) + \sum_{i=0}^{n} \frac{g_{i-ASE}}{A_{\mathit{eff}}} P_i(z) \left( P_{ASE}(z) + h\nu \left( 1 + \frac{1}{\exp\left(\frac{h\Delta\nu}{KT}\right) - 1} \right) \right),$$

where $P_{ASE}(z)$ is the out-of-band ASE power of the frequency v varying with the distance z, $\alpha_{ASE}$ is an attenuation coefficient of the out-of-band ASE at a certain frequency, $$\frac{g_{i-ASE}}{A_{\mathit{eff}}}$$

is a gain coefficient from the i-th pump to the out-of-band ASE of the frequency v, h is the Planck's constant, v is the frequency of the out-of-band ASE, K is the Boltzmann constant, T is the ambient temperature, $\Delta v$ is the frequency shift from the pump light frequency to the out-of-band ASE, and $P_i(z)$ is the power value of the i-th pump;

weighting the power variable in the out-of-band ASE power relational expression by a weighting value $$10^{\frac{pointloss}{10}}$$

comprising replacing the variable $P_n(Z)$ on a right side of the out-of-band ASE power relational expression by $$P_n(z) \times 10^{\frac{Pointloss}{10}}.$$

In a fourth aspect, the present disclosure provides a method for determining a 0 km-equivalent joint loss of fiber attenuation coefficient in a Raman fiber amplifier, comprising:

obtaining a pump transmission power relational expression, a signal transmission power relational expression, and an out-of-band ASE power relational expression;

weighting respective power variables in the pump transmission power relational expression, the signal transmission power relational expression and the out-of-band ASE power relational expression by a weighting value $$10^{\frac{Pointloss}{10}};$$

adjusting a fiber attenuation coefficient in the pump transmission power relational expression, the signal transmission power relational expression and the out-of-band ASE power relational expression with a preset step m times, and solving out-of-band ASE power value from the pump transmission power relational expression, the signal transmission power relational expression and the out-of-band ASE power relational expression every time the fiber attenuation coefficient is adjusted, and substituting the out-of-band ASE power value into a relational expression between the out-of-band ASE power and a 0 km-equivalent joint loss to obtain the 0 km-equivalent joint loss; and further calculating 0 km-equivalent joint loss for the other m-1 times of adjustments, thereby obtaining m pairs of fiber attenuation coefficient and corresponding 0 km-equivalent joint loss.

Preferably, the relational expression between the out-of-band ASE power and the 0 km-equivalent joint loss is as follows: Pointloss=$(ASE_{out-of-band} - k^* P_{pump} - b)/(k+1)$, where k is a tilt of the linear relationship, b is an intercept of the straight line.

Preferably, solving the relational expression between the out-of-band ASE power and the 0 km-equivalent joint loss further comprises:

for a selected pump laser pump1, calculating out-of-band ASE detection values corresponding to respective output power values of the pump1 when the joint loss Pointloss is 0, solving parameters k and b in the formula 0=$ASE_{out-of-band} - k^* P_{pump} - b$ according to the out-of-band ASE detection values corresponding to respective output power values, then presenting the joint loss as Pointloss=$(ASE_{out-of-band} - k^* P_{pump} - b)/(k+1)$.

Preferably, the joint loss Pointloss of the weighted value in the pump transmission power relational expression, the signal transmission power relational expression and the out-of-band ASE power relational expression is 0, and a corresponding fiber length is set to be larger than 100 km.

Preferably, the pump transmission power relational expression, the signal transmission power relational expression and the out-of-band ASE power relational expression are reformed into a format that is supported by a numerical method of ordinary differential equation in Matlab;

a numerical solution of the differential equation is calculated by using a fourth-order Runge-Kutta algorithm or a boundary value method in Matlab.

Preferably, the pump transmission power relational expression further comprises:

a first pump light transmission power relational expression:

$$\frac{dP_0(z)}{dz} = \alpha_0 P_0(z) + \sum_{k=1}^{n} \frac{g_{0k}}{A_{\mathit{eff}}} P_0(z) P_k(z),$$

where $\alpha_0$ is a transmission loss of a wavelength corresponding to the pump $$P_0, \frac{g_{0k}}{A_{\mathit{eff}}}$$

is a Raman gain coefficient from the pump $P_0$ to the pump or signal $P_k$, a second pump light transmission power relational expression:

$$\frac{dP_i(z)}{dz} = \alpha_i P_i(z) - \sum_{j=0}^{i-1} \frac{g_{ji}}{A_{\mathit{eff}}} P_i(z) P_j(z) + \sum_{k=i+1}^{n} \frac{g_{ik}}{A_{\mathit{eff}}} P_i(z) P_k(z),$$

where $\alpha_i$ is a transmission loss of a wavelength corresponding to the pump $P_i, \dfrac{g_{ji}}{A_{eff}}$ is a gain coefficient between the pump $P_j$ and the pump $P_j, \dfrac{g_{ik}}{A_{eff}}$ is a gain coefficient between the pump $P_j$ and the pump or signal $P_k$;

weighting the power variables in the pump light transmission power relational expressions by a weighting value $$10^{\frac{Pointloss}{10}}$$

comprising replacing the variables $P_0(Z)$ and $P_i(Z)$ on a right side of the first and second pump light transmission power relational expressions by $$P_0(z) \times 10^{\frac{Pointloss}{10}} \text{ and } P_i(z) \times 10^{\frac{Pointloss}{10}},$$

respectively.

Preferably, the signal transmission power relational expression further comprises:

$$\frac{dP_n(z)}{dz} = -\alpha_n P_n(z) + \sum_{j=0}^{n-1} \frac{g_{in}}{A_{eff}} P_n(z) P_j(z),$$

where $\alpha_n$ is an attenuation coefficient of the n-th signal wavelength, $\dfrac{g_{in}}{A_{eff}}$ is a gain coefficient between the j-th pump and the n-th signal, $P_n$ is power of the n-th signal, $P_j(z)$ is power of the j-th signal or pump with a wavelength less than the n-th signal wavelength;

weighting the power variable in the signal transmission power relational expression by a weighting value $$10^{\frac{Pointloss}{10}}$$

comprising replacing the variable $P_n(Z)$ on a right side of the signal transmission power relational expression by $$P_n(z) \times 10^{\frac{Pointloss}{10}}.$$

Preferably, the out-of-band ASE power relational expression further comprises:

$$\frac{dP_{ASE}(z)}{dz} =$$
$$-\alpha_{ASE} P_{ASE}(z) + \sum_{i=0}^{n} \frac{g_{i-ASE}}{A_{eff}} P_i(z)\left(P_{ASE}(z) + h\nu\left(1 + \frac{1}{\exp\left(\frac{h\Delta\nu}{KT}\right) - 1}\right)\right);$$

where $P_{ASE}(z)$ is the out-of-band ASE power of the frequency v varying with the distance z, $\alpha_{ASE}$ is an attenuation coefficient of the out-of-band ASE at a certain frequency, $\dfrac{g_{i-ASE}}{A_{eff}}$ is a gain coefficient from the i-th pump to the out-of-band ASE of the frequency v, h is the Planck's constant, v is the frequency of the out-of-band ASE, K is the Boltzmann constant, T is the ambient temperature, $\Delta\nu$ is the frequency shift from the pump light frequency to the out-of-band ASE, and $P_i(z)$ is the power value of the i-th pump;

weighting the power variable in the out-of-band ASE power relational expression by a weighting value $$10^{\frac{Pointloss}{10}}$$

comprising replacing the variable $P_n(Z)$ on a right side of the out-of-band ASE power relational expression by $$P_n(z) \times 10^{\frac{Pointloss}{10}}.$$

In a fifth aspect, the present disclosure also provides a method for determining an impact factor of a fiber length on a maximum gain of a Raman fiber amplifier, comprising:

obtaining a pump transmission power relational expression, a signal transmission power relational expression, and an out-of-band ASE power relational expression, and a plurality of fiber lengths for relational expressions corresponding to the impact factor to be solved; selecting each fiber length and configuring it into the respective relational expressions to solve the impact factor as follows:

setting an initial pump value in the above relational expressions to 0 and initial power of the signal light to P1, and obtaining signal power $P_{(L\text{-}pump\ off)}$ at the fiber end according to the above relational expressions;

setting the initial value of the pump power to a preset value P2, and obtaining the signal power $P_{(L\text{-}pump\ on)}$ at the fiber end and the out-of-band ASE power $P_{ASE}$ according to the above relational expressions;

the impact factor $A_4$ caused by the fiber length being $(P_{(L\text{-}pump\ on)} - P_{(L\text{-}pump\ off)} - IL)/P_{max\_calibration}$, where IL is the inherent insertion loss of the amplifier, $P_{max\_calibration}$ is the calibrated maximum gain of the Raman fiber amplifier, and $P_{(L\text{-}pump\ on)}$, $P_{(L\text{-}pump\ off)}$ and $P_{max\_calibration}$ are in dBm.

Preferably, a fiber attenuation coefficient in the pump transmission power relational expression, the signal transmission power relational expression and the out-of-band ASE power relational expression is set to a calibration value.

Preferably, obtaining the signal power $P_{(L\text{-}pump\ on)}$ at the fiber end and the out-of-band ASE power $P_{ASE}$ further comprises:

reforming the pump transmission power relational expression, the signal transmission power relational expression and the out-of-band ASE power relational expression into a format that is supported by a numerical method of ordinary differential equation in Matlab;

calculating a numerical solution of the differential equation by a fourth-order Runge-Kutta algorithm or a boundary value method in Matlab.

Preferably, the pump transmission power relational expression further comprises:

a first pump light transmission power relational expression:

$$\frac{dP_0(z)}{dz} = \alpha_0 P_0(z) + \sum_{k=1}^{n} \frac{g_{0k}}{A_{eff}} P_0(z) P_k(z),$$

where $\alpha_0$ is a transmission loss of a wavelength corresponding to the pump $$P_0, \frac{g_{0k}}{A_{eff}}$$

is a Raman gain coefficient from the pump $P_0$ to the pump or signal $P_k$, a second pump light transmission power relational expression:

$$\frac{dP_i(z)}{dz} = \alpha_i P_i(z) - \sum_{j=0}^{i-1} \frac{g_{ji}}{A_{eff}} P_i(z) P_j(z) + \sum_{k=i+1}^{n} \frac{g_{ik}}{A_{eff}} P_i(z) P_k(z),$$

where $\alpha_i$ is a transmission loss of a wavelength corresponding to the pump $$P_i, \frac{g_{ji}}{A_{eff}}$$

is a gain coefficient between the pump $P_i$ and the pump $$P_j, \frac{g_{ik}}{A_{eff}}$$

is a gain coefficient between the pump $P_i$ and the pump or signal $P_k$.

Preferably, the signal transmission power relational expression further comprises:

$$\frac{dP_n(z)}{dz} = -\alpha_n P_n(z) + \sum_{j=0}^{n-1} \frac{g_{jn}}{A_{eff}} P_n(z) P_j(z),$$

where $\alpha_n$ is an attenuation coefficient of the n-th signal wavelength, $$\frac{g_{jn}}{A_{eff}}$$

is a gain coefficient between the j-th pump and the n-th signal, $P_n$ is power of the n-th signal, $P_j(z)$ is power of the j-th signal or pump with a wavelength less than the n-th signal wavelength.

Preferably, the out-of-band ASE power relational expression further comprises:

$$\frac{dP_{ASE}(z)}{dz} = -\alpha_{ASE} P_{ASE}(z) + \sum_{i=0}^{n} \frac{g_{i-ASE}}{A_{eff}} P_i(z) \left( P_{ASE}(z) + h\nu \left(1 + \frac{1}{\exp\left(\frac{h\Delta\nu}{KT}\right) - 1}\right) \right);$$

where $P_{ASE}(z)$ is the out-of-band ASE power of the frequency v varying with the distance z, $\alpha_{ASE}$ is an attenuation coefficient of the out-of-band ASE at a certain frequency, $$\frac{g_{i-ASE}}{A_{eff}}$$

is a gain coefficient from the i-th pump to the out-of-band ASE of the frequency v, h is the Planck's constant, v is the frequency of the out-of-band ASE, K is the Boltzmann constant, T is the ambient temperature, $\Delta v$ is the frequency shift from the pump light frequency to the out-of-band ASE, and $P_i(z)$ is the power value of the i-th pump.

Preferably, obtaining the calibrated maximum gain $G_{max\_calibration}$ further comprises:

establishing a relational expression between a gain tilt and a maximum gain through collecting maximum gain values of a Raman fiber amplifier under respective gain tilts in advance;

looking up the above established relational expression between the gain tilt and the maximum gain by a gain tilt of a current fiber transmission line to obtain a calibrated maximum gain $G_{max\_calibration}$.

Preferably, establishing a relational expression between a gain tilt and a maximum gain comprises:

when Tilt<Tilt$_{turning\ point}$, $$G_{max\_calibration} = k_{01} * Tilt + b_{01};$$

when TILT≥TILT$_{turning\ point}$, $$G_{max\_calibration} = k_{02} * Tilt + b_{02};$$

and looking up the above established relational expression between the gain tilt and the maximum gain by a gain tilt of a current fiber transmission line to obtain a calibrated maximum gain $G_{max\_calibration}$ further comprises:

substituting a Tilt setting value into corresponding one of the above two formulas to obtain the calibrated maximum gain $G_{max\_calibration}$.

In a sixth aspect, the present disclosure also provides an apparatus for automatic gain control of a Raman fiber amplifier, comprising: at least one processor; and a memory in communication with the at least one processor; wherein the memory stores instructions that are executable by the at least one processor, the instructions are programed to perform the method of any of the first to fifth aspects.

In a seventh aspect, the present disclosure also provides a non-volatile computer storage medium having computer executable instructions stored therein, the computer executable instructions being executed by one or more processors for performing the method of any of the first to fifth aspects.

Compared with the prior arts, the embodiments of the present disclosure can produce the following beneficial effects:

The actual maximum gain calculated in the first aspect of the present disclosure is the maximum gain that can be achieved over all input power ranges. By doing so, the transient control can make sure that the original signal in the system can operate at a fixed gain. That is, a gain locking can be realized, and thereby fluctuation of existing transmission signal power caused by signal change in the fiber transmission link can be avoided.

The second aspect of the present disclosure provides two reference dimensions of maximum gain and actual gain that the current amplifier can achieve for gain control, and provides a reference angle for automatic gain control of the Raman fiber amplifier. It also proposes a compensation gain ΔG, which can help to achieve more accurate control as compared with the prior art that power amplification is only detected through out-of-band ASE. Compared with the equal-step adjustment method commonly adopted in the prior arts, as the embodiments of the present disclosure calculate the maximum gain value that can be actually obtained, adjustment of gain control of the Raman fiber amplifier can be quickly performed according to the setting gain value and the actual gain value.

The third aspect of the present disclosure provides a method for determining a 0 km-equivalent joint loss of a fiber node in a Raman fiber amplifier, and the 0 km-equivalent joint loss for a distance from a joint to a pump source obtained by the method can be used in the process of calculating the actual maximum gain.

The fourth aspect of the present disclosure provides a method for determining a 0 km-equivalent joint loss of a fiber node in a Raman fiber amplifier, and the 0 km-equivalent joint loss for various fiber attenuation coefficients obtained by the method can be used in the process of calculating the actual maximum gain.

The fifth aspect of the present disclosure provides a method for determining an impact factor of a fiber length on a maximum gain of a Raman fiber amplifier, and the impact factor of the fiber length on the maximum gain of the Raman fiber amplifier obtained by the method can be used in the process of calculating the actual maximum gain.

BRIEF DESCRIPTION OF THE DRAWINGS

In order to more clearly illustrate embodiments of the present disclosure or technical solutions in the prior art, the drawings used in the embodiments or the prior art description will be briefly described below. Obviously, the drawings in the following description are only some embodiments of the present disclosure, for those ordinary skill in the art, other drawings may be obtained according to these drawings without paying any inventive labor.

REFERENCE SIGNS

Figure 1:
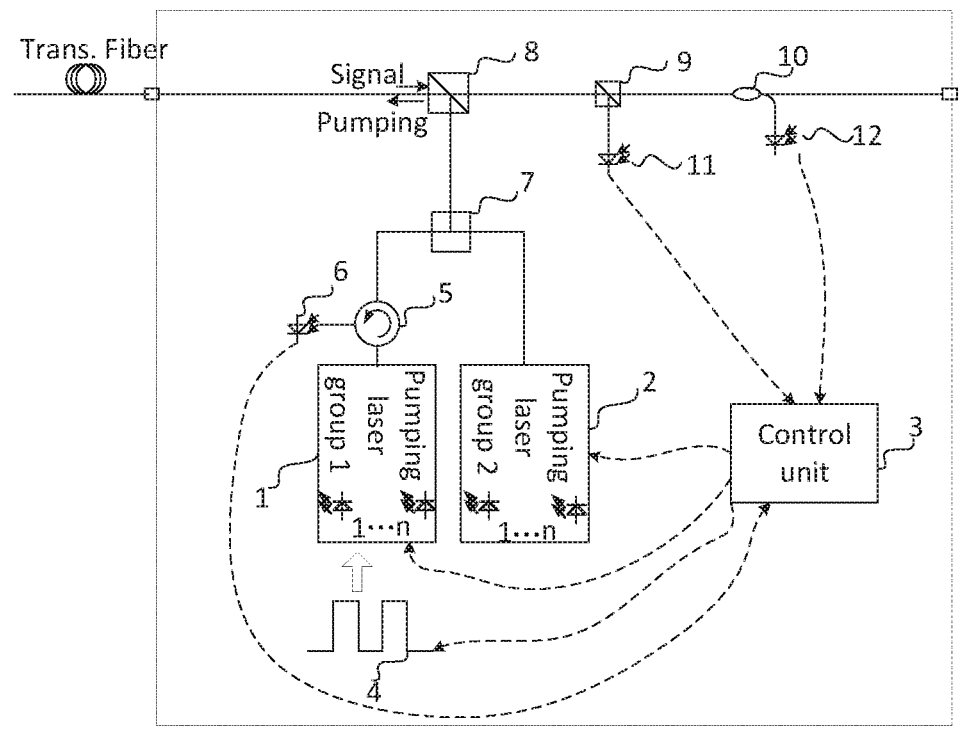
FIG. 1 is a diagram of a pump unit of a distributed Raman fiber amplifier using a pump laser itself as an OTDR according to an embodiment of the present disclosure.

| | |
|---|---|
| 1: | Pump laser group 1; |
| 2: | Pump laser group 2; |
| 3: | Control unit; |
| 4: | Modulated signal of OTDR; |
| 5: | Circulator; |
| 6: | OTDR detector; |
| 7: | Pump combination WDM; |
| 8: | Pump/signal combination WDM; |
| 9: | Out-of-band/in-band split DM; |
| 10: | Coupler; |
| 11: | Out-of-band ASE detector; |
| 12; | In-band photodetector; |
| 13: | OTDR wavelength and signal wavelength combination WDM; |
| 14: | Additional laser for OTDR. |

DETAILED DESCRIPTION

In order to make the purpose, the technical solution and advantages of the present disclosure clearer and clearer, the present disclosure will be described in further detail below with reference to the drawings and embodiments. It should be understood that the embodiments described herein are only for the purpose of explaining the present disclosure and are not intended to limit the present disclosure.

In the description of the present disclosure, the orientation or positional relationship indicated by the terms "inner", "outer", "longitudinal", "transverse", "upper", "lower", "top", "bottom" and the like is based on the orientation or positional relationship shown in the drawings, only for convenience of description of the present disclosure rather than requiring the invention to be constructed and operated in a specific orientation, therefore, it should not be understood as limiting the present disclosure.

In embodiments of the present disclosure, a Raman pump laser is also called as a pump source for short; in each embodiment of the present disclosure, after a first appearance of the specific distance between the joint and the pump source or the specific fiber loss coefficient of the 0 km-equivalent joint loss, the 0 km-equivalent joint loss is used as a short name in corresponding embodiments, and the above description is particularly applicable to embodiment 3 and embodiment 4. In each embodiment of the present disclosure, the 0 km-equivalent joint loss caused by the distance between the joint and the pump source is also described as the 0 km-equivalent joint loss of the fiber node for convenience of description. In the embodiments of the present disclosure, the fiber length generally refers to a transmission distance between a signal transmission and a signal reception, and in a real communication system, it is a distance between two adjacent relay stations, here, the relay may be either an electrical relay or an optical relay.

Further, the technical features involved in each embodiment of the present disclosure described below may be combined with each other as long as they do not conflict with each other.

In FIG. 1, the portion shown in a dashed box is a complete distributed Raman pump module including a control unit 3, a pump laser group 1 and a pump laser group 2, wherein the pump laser group 1 and the pump laser group 2 each include at least one pump laser (in the embodiments of the present disclosure, the pump laser group is divided into two groups for convenience of description, and the number of pump lasers included in each group of pump lasers is not particularly limited, furthermore, those skilled in the art may apply relevant technical contents to the pump lasers of the pump laser group 1 and the pump laser group 2 based on the description of the relevant technical contents for the pump laser group 1 and the pump laser group 2 in each embodiment of the present disclosure), and wavelengths of one of the pump lasers will be used as operating wavelengths of the OTDR; the control unit 3 generates a modulated signal 4 of OTDR to drive a pump laser used as an OTDR light source to operate. As shown in FIG. 1, a certain pump laser of the pump laser group 1 generates a detecting light of OTDR, which sequentially passes through a circulator 5, a pump combination WDM 7 and a pump/signal combination WDM 8 and enters a transmission fiber, an OTDR echo signal returned from the transmission fiber again sequentially passes through the pump/signal combination WDM 8, the pump combination WDM 7 and the circulator 5 and then is received by the OTDR detector 6, and the OTDR detector 6 transmits the detection result to the control unit 3. Therefore, the joint losses, the fiber lengths and the fiber loss coefficients at different positions of the fiber are detected by the OTDR mode under control of the control unit 3, and stored in the control unit 3. Those skilled in the art should understand that it is also feasible to use wavelengths of one pump laser in the pump laser group 2 as operating wavelengths of the OTDR, and all of the following description takes the wavelengths of the pump laser in the pump laser group 1 as the operating wavelengths of the OTDR, as an example.

As shown in FIG. 1, because the amplification function of the Raman pump module cannot normally work when wavelengths of the pump laser in the pump laser group 1 is used as the OTDR operating wavelength, the OTDR is only applied during initialization of the Raman pump module or when the fiber line is broken and the fault location is performed. waves from the pump laser group 1 firstly passes through the circulator 5, and are combined by the pump laser group 1 and the pump laser group 2 through a pump/pump combination WDM 7, and after the pump combination, the waves are connected to the transmission fiber through the pump/signal combination WDM 8; at the signal output terminal of the pump/signal combination WDM 8, firstly, the out-of-band ASE is separated by the out-of-band/in-band split WDM 9, and the out-of-band ASE is detected by the out-of-band ASE detector 11; then, a part of the in-band light is separated by the coupler 10 and is performed an in-band light detection by the in-band photodetector 12.

Figure 2:
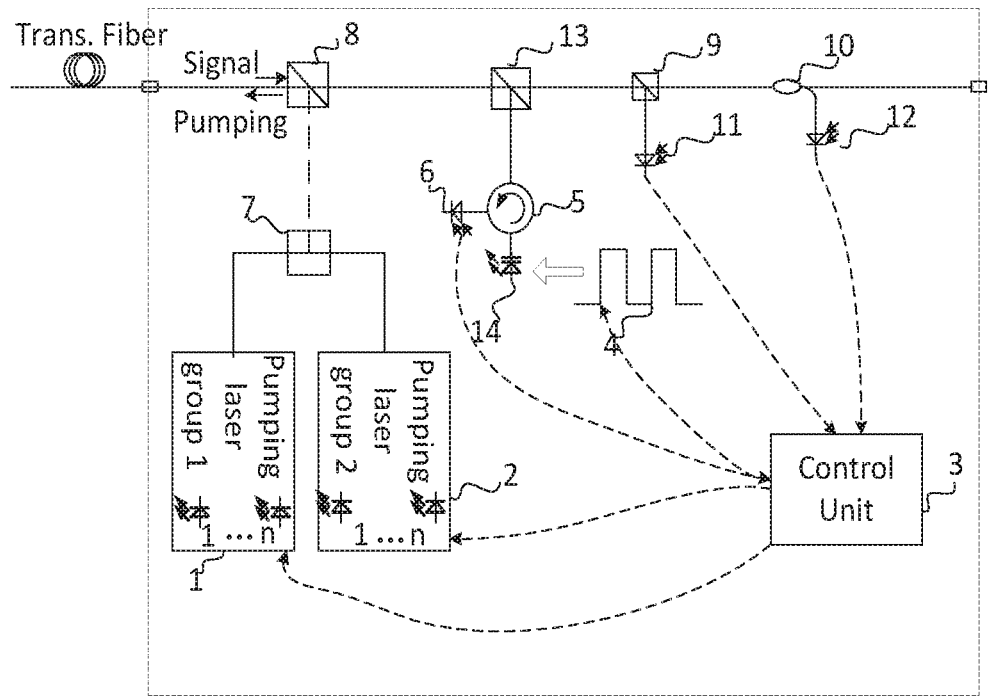
FIG. 2 is a diagram of a pump unit of a distributed Raman fiber amplifier using another laser as an OTDR according to an embodiment of the present disclosure.

The difference between the embodiment shown in FIG. 2 and the embodiment shown in FIG. 1 is that the light source of OTDR does not use the wavelength of the pump laser group 1 itself, and the OTDR light source 14 is added, due to the addition of the additional OTDR light source 14, an additional OTDR wavelength and signal wavelength combination WDM13 need to be added. In this embodiment, as shown in FIG. 2, the control unit 3 generates a modulated signal 4 of OTDR to drive the OTDR light source 14 to operate, and generates a detecting light of OTDR, which sequentially passes through the circulator 5, the OTDR wavelength and signal wavelength combination WDM 13 and enters the transmission fiber, and an OTDR echo signal returns from the transmission fiber sequentially passes through the signal wavelength combination WDM13 and the circulator 5, and then is received by the OTDR detector 6, and the OTDR detector 6 transmits the detection result to the control unit 3. The advantage of using the additional OTDR light source 14 to realize the OTDR function is that the line condition may be detected in real time.

In different application environments, the amplification gain of the Raman fiber amplifier will be doubly limited by pump power itself and impact of environmental factor (including a distance between a joint and a pump source, a loss coefficient of fiber, the mode field diameter of fiber and the length of fiber), therefore, an actual maximum gain $G_{max\_factual}$ of a Raman pump module is defined as the maximum gain that may actually be achieved in its environment (meeting requirements of signal-to-noise ratio and transmission performances, etc.) by this Raman fiber amplifier; a setting gain $G_{setting}$ of a Raman pump module is defined as a gain value set by a user for a Raman fiber amplifier; a control gain $G_{operation}$ of a Raman pump module is defined as a gain value actually set for a Raman pump module. Those skilled in the art should understand that the setting gain $G_{setting}$ of a Raman pump module set by a user may be larger than the actual maximum gain $G_{max\_factual}$ of the Raman fiber amplifier, and may also be less than or equal to the actual maximum gain $G_{max\_factual}$ of the Raman fiber amplifier; if the setting gain $G_{setting}$ set by the user is larger than the maximum gain $G_{max\_factual}$, the control gain $G_{operation}$ of the Raman fiber amplifier is the maximum gain $g_{max\_factual}$; if the setting gain $G_{setting}$ set by the user is less than or equal to the maximum gain $G_{max\_factual}$, the control gain $G_{operation}$ of the Raman fiber amplifier is the setting gain $G_{setting}$. In addition, the corresponding maximum gain will also change in a case of different gain tilts.

Figure 3:
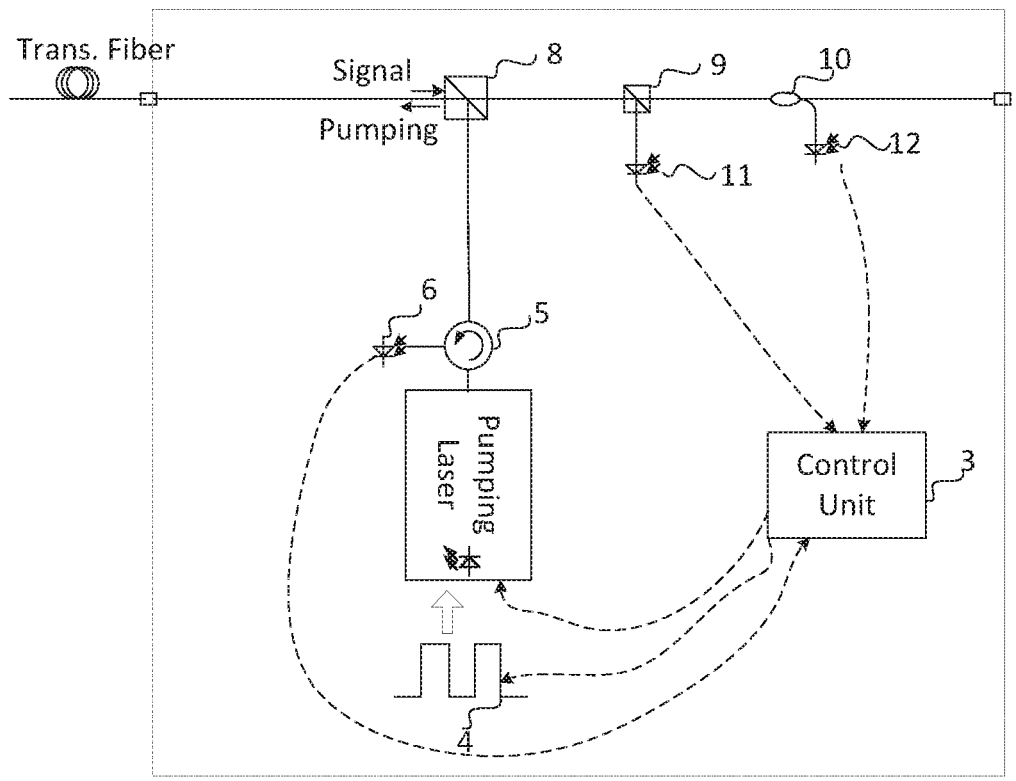
FIG. 3 is a diagram of a pump unit of a Raman fiber amplifier using a pump laser itself as an OTDR according to an embodiment of the present disclosure.
Figure 4:
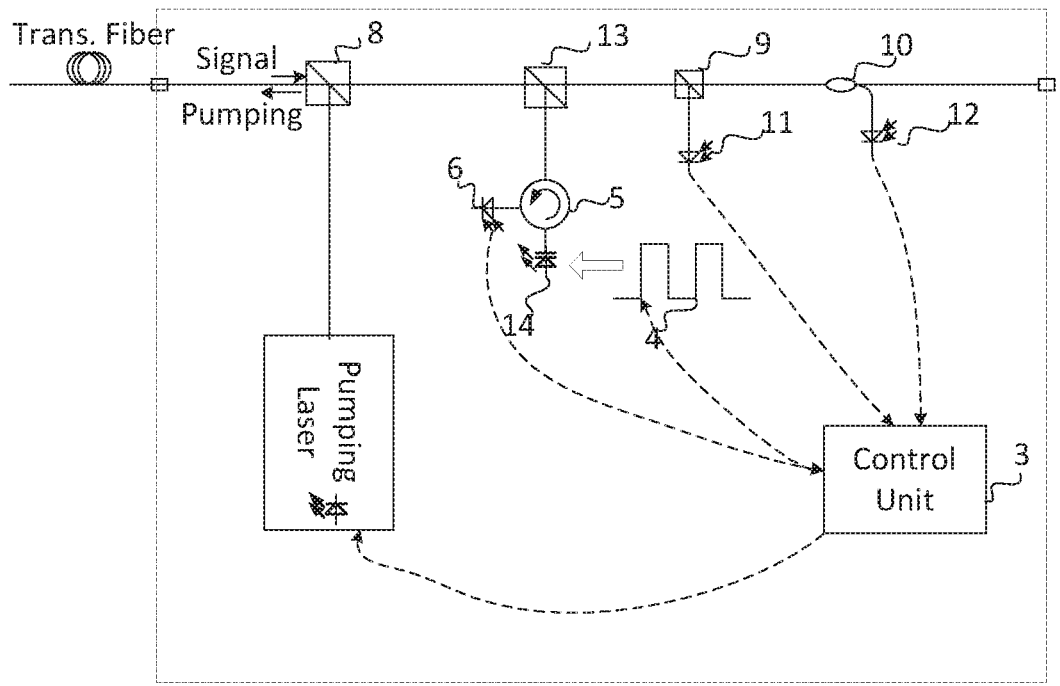
FIG. 4 is a diagram of a pump unit of a Raman fiber amplifier using another laser as an OTDR according to an embodiment of the present disclosure.

It should be emphasized that the expanded description of the subsequent embodiments of the present disclosure may be applied to the distributed Raman fiber amplifier as shown in FIG. 1 and FIG. 2, and also to the application scenario (e.g., as shown in FIG. 3 and FIG. 4) of a single Raman fiber amplifier, wherein involved differences between the two will be distinguishingly described.

The description of each embodiment of the present disclosure may be realized based on the above architectures (e.g., the architectures shown in FIG. 1, FIG. 2, FIG. 3 and FIG. 4), but the corresponding method implementation is not only limited to the above architecture contents. And the above definition description of each gain object is applicable to each embodiment of the present disclosure for facilitating to understand its meaning when it appears in each embodiment of the present disclosure.

When the technical solutions described in the embodiments of the present disclosure are specifically described, the implementation significance of the present disclosure is described by way of example. The main purpose of the present disclosure is to be able to determine the maximum gain, which may be achieved in all input power ranges, in this way, in the aspect of transient control, the original signal of the system may be kept to operate at a fixed gain, i.e. a gain locking effect may be realized. In the prior art, since the actual maximum gain value proposed in the present disclosure may not be determined, therefore, after the power signals P1, P1, and P3 in the initial situation are adjusted and enter the maximum gain control stage in the prior art, if the signals P4~P50 are suddenly added, at this time, for the P1-P3 signals, because P4~P50 signal lights sharing the optical power of the pump laser with the signals P1 to P3 are generated, that is to say, when the new P4~P50 signal lights enter the transmission optical path, the pump laser is unable to generate a higher pump light power, at this time, the result is that the signal transmission optical power of the amplified signals P1-P3 will decrease, which is sometimes fatal for the remote receiving terminals of the P1-P3 signals, and because they have been accustomed to the power intensity of P1-P3 in history, and the sudden intervention of the P4~P50 signals will result in the decrease of P1-P3 transmission optical power, even leads to a signal loss or a signal decoding error at the receiving terminal etc. The significance of the present disclosure is to solve the above problems in the prior art.

Embodiment 1

Figure 5:
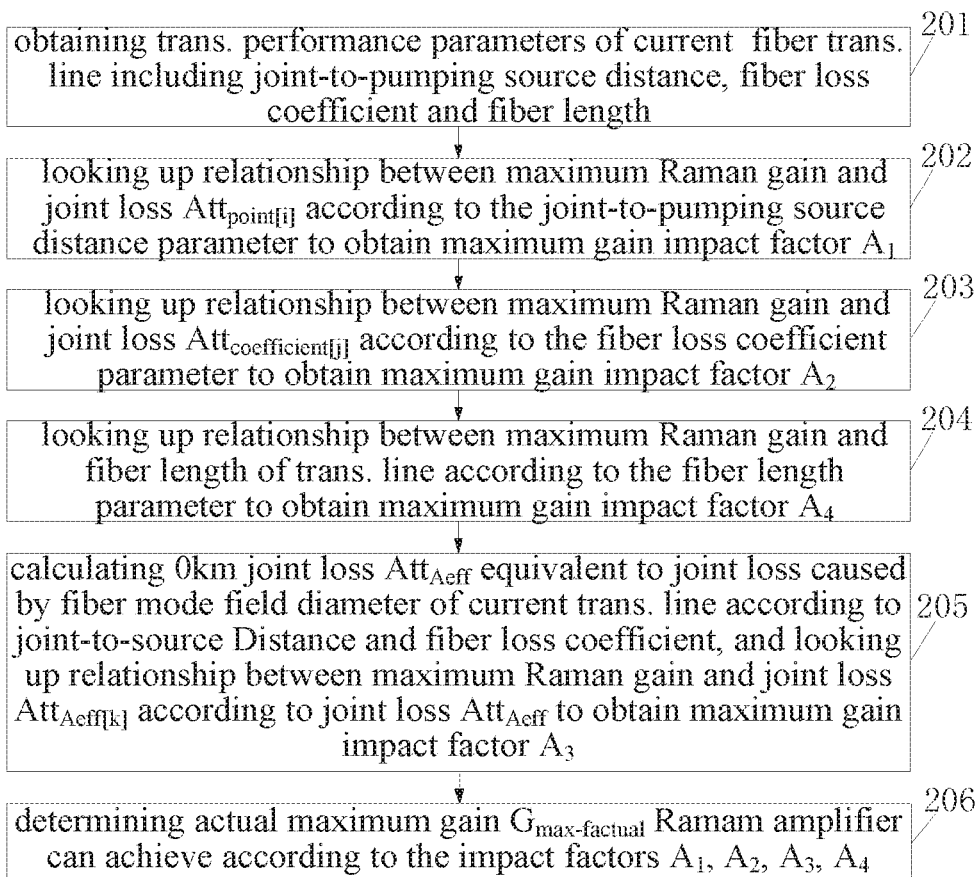
FIG. 5 is a flowchart of a method for determining a maximum gain of a Raman fiber amplifier according to an embodiment of the present disclosure.

An embodiment of the present disclosure provides a method for determining a maximum gain (specifically refers to the actual maximum gain $G_{max\_factual}$) of a Raman fiber amplifier. Since the embodiment of the present disclosure may be applied to the apparatus architectures corresponding to FIG. 1, FIG. 2, FIG. 3, and FIG. 4 described above, therefore, for the sake of clarity and simplicity of the description, the corresponding apparatus structures may be referred to in the subsequent process for describing the technical solutions so as to better understand the specific implementation of embodiments of the present disclosure. Before implementing the method described in the embodiments of the present disclosure, it is usually necessary to make some preparations so that the subsequent steps related to the embodiments of the present disclosure may be smoothly performed. The above-mentioned preparations include pre-configuring a relationship between the maximum Raman gain and a 0 km joint loss $Att_{point[i]}$ equivalent to a joint loss at different positions of one or more types of fibers; a relationship between the maximum Raman gain and a 0 km joint loss $Att_{coefficient[j]}$ equivalent to a joint loss caused by a loss coefficient of the fibers; a relationship between the maximum Raman gain and a 0 km joint loss $Att_{Aeff[k]}$ equivalent to a joint loss caused by a mode field diameter of the fibers; a relationship between the maximum Raman gain and a fiber length; where i is a distance from a joint to a pump source, j is the loss coefficient of the fibers, and k is a mode field diameter of the fibers; where said 0 km shows that a position for collecting out-of-band ASE power is the same position (e.g. in a device or in a workshop) as the position where a pump laser is set, which is a preferred approximate equivalent distance of the embodiments of the present disclosure; in addition, the distance of the equivalent joint loss may also be other distance parameter values (for example: 0.001 km-0.005 km, which shows that the ASE power detector and the pump laser are set in one workshop), and the technical solutions of equivalent-distance joint loss obtained by related derived distances are all within protection scope of the embodiments of the present disclosure. In a plurality of embodiments, the above-mentioned relationships may be stored in the control unit 3 in a form of a specific calculation formula, or in a form of a table, and may also adopt a mode combing both, i.e. storing N groups of typical discrete data appearing at a high probability, and for a case where an object to be looked up is not in the N groups of discrete data in the looking-up process, the curve property is then obtained by solving a calculation formula in real time or by fitting according to calculation formula, or obtained by adopting an interpolation calculation for N groups of discrete data, etc. As shown in FIG. 5, the method for determining a maximum gain of Raman fiber amplifier comprises:

In step 201, obtaining transmission performance parameters of a current optical fiber transmission line, where the transmission performance parameters include a distance between a joint and a pump source, a fiber loss coefficient, and a fiber length.

The obtaining mode may be detecting joint losses, fiber loss coefficients and fiber lengths at different positions of the fiber in the OTDR mode under the control of the above control unit 3. For example, the control unit 3 may specifically adopt architectures with OTDR detection function shown in FIG. 1, FIG. 2, FIG. 3 or FIG. 4 to complete the obtainment of the transmission performance parameters.

In step 202, looking up the relationship between the maximum Raman gain and the joint loss $Att_{point[i]}$ to obtain a maximum gain impact factor $A_1$ according to the distance between the joint and the pump source included in the transmission performance parameters.

Figure 6:
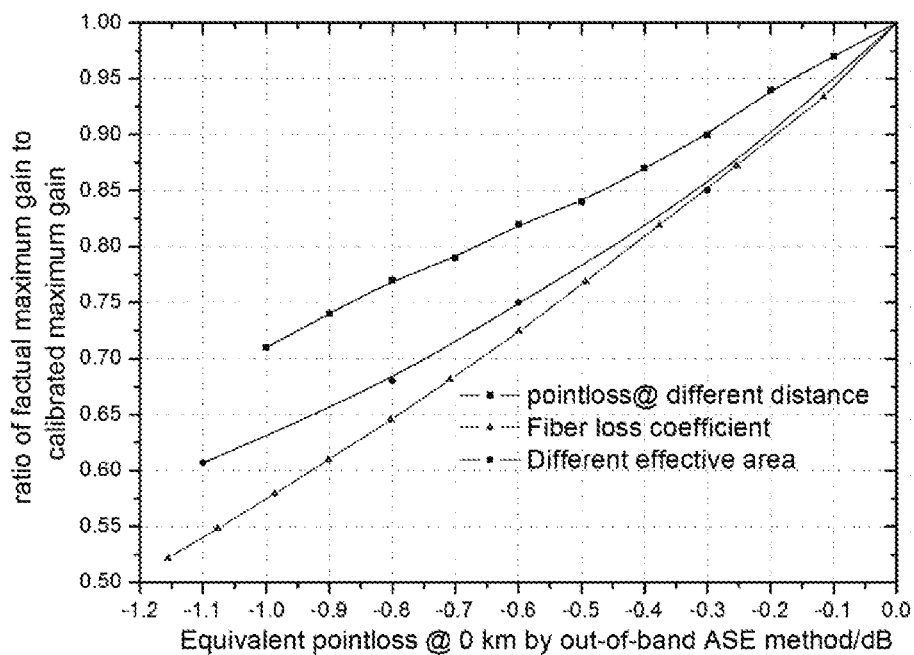
FIG. 6 is a ratio diagram of a maximum Raman gain can be achieved to the calibrated maximum Raman gain in a case where the equivalent joint loss is less than 0 according to an embodiment of the present disclosure.

FIG. 6 illustrates a schematic diagram depicting effects after fitting each equivalent joint loss $Att_{point[i]}$ and impact factor $A_1$ into a curve, particularly a curve marked by discrete solid boxes. It can be seen from FIG. 6 that its ordinate values are the impact factors $A_1$ calculated from the ratios of the calibrated maximum gains and the actual maximum gains impacted by the distances between the joints to the pump source. It should be noted that in the embodiments of the present disclosure, it is only for convenience of description and observation by the curve to represent the maximum gain impact factor obtained by the relationship between the joint loss value $Att_{point[i]}$ and the maximum Raman gain, and for the similar implementations on the control unit 3, all of them will be converted into arrays to obtain the impact factor $A_1$ by looking up or to obtain the impact factor $A_1$ by real-time calculation in the mode of a relational expression for calculation.

In step 203, looking up the relationship between the joint loss value $Att_{coefficient[j]}$ and the maximum Raman gain to obtain a maximum gain impact factor $A_2$ according to the fiber loss coefficient included in the transmission performance parameters.

FIG. 6 illustrates a schematic diagram depicting effects after fitting each joint loss $Att_{coefficient[j]}$ and impact factor $A_2$ into a curve, particularly a curve marked by discrete solid triangles. It can be seen from FIG. 6 that its ordinate values are impact factors $A_2$ obtained by calculating the ratios of the actual maximum gains affected by the fiber loss coefficient to the calibrated maximum gains.

In step 204, looking up the relationship between the maximum Raman gain and the fiber length of transmission line to obtain a maximum gain impact factor $A_4$ according to the fiber length included in the transmission performance parameters.

Figure 7:
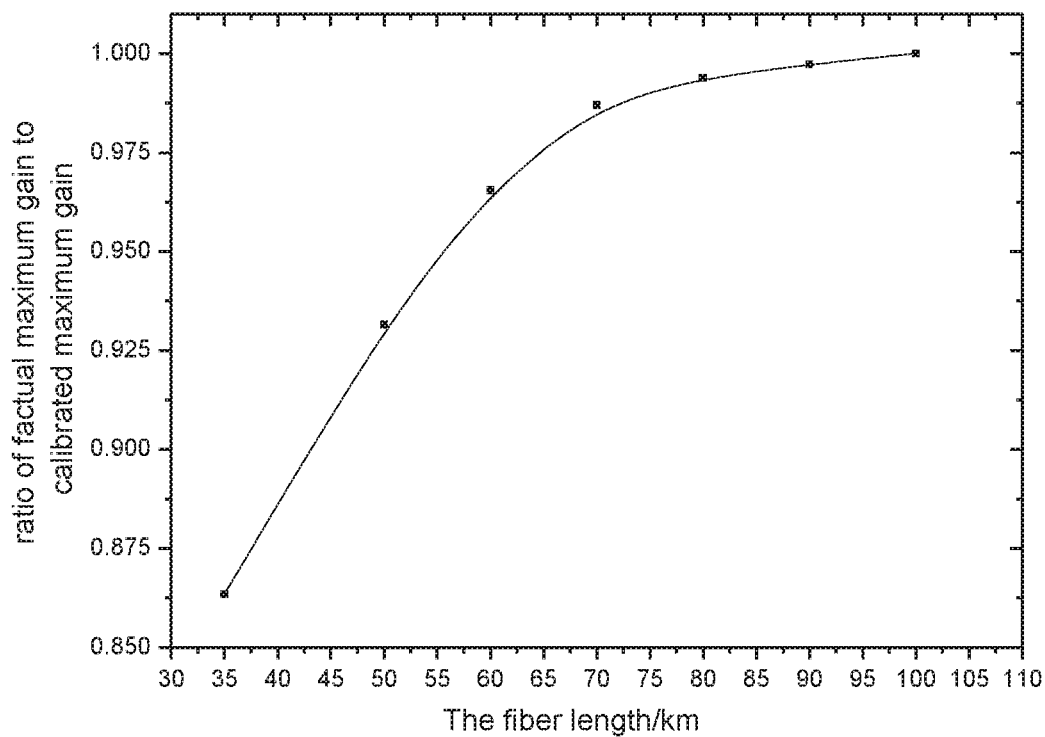
FIG. 7 is a ratio diagram of the maximum Raman gain can be achieved to the maximum Raman gain at the time of calibration (>=100 km) in a case of different fiber lengths according to an embodiment of the present disclosure.

FIG. 7 illustrates a schematic diagram for depicting effects after fitting fiber lengths and impact factors A4 into a curve. It can be seen from FIG. 7 that its ordinate values are impact factors $A_4$ obtained by calculating the ratios of the actual maximum gains affected by the fiber length to the calibrated maximum gains.

In step 205, calculating a 0 km joint loss $Att_{Aeff}$ equivalent to a joint loss caused by the mode field diameter in the current fiber transmission line according to the fiber loss coefficient, the distance between the joint and the pump source, and looking up the relationship between the joint loss $Att_{point[k]}$ and the maximum Raman gain to obtain a maximum gain impact factor $A_3$ according to the joint loss value $Att_{Aeff}$.

FIG. 6 illustrates a schematic diagram for depicting effects after fitting each joint loss value $Att_{Aeff[k]}$ and impact factor $A_3$ into a curve, particularly a curve marked by discrete solid circulars. It can be seen from FIG. 6 that its ordinate values are impact factors $A_3$ obtained by calculating the ratios of the actual maximum gains affected by the mode field diameter of fiber to the calibrated maximum gains.

In step 206, determining the actual maximum gain $G_{max\_factual}$ which may actually be achieved by the Raman fiber amplifier according to the impact factors $A_1$, $A_2$, $A_3$, and $A_4$.

According to the embodiment of the present disclosure, after obtaining the distance between the joint and the pump source, and the fiber loss coefficient both affecting the actual gains of an optical Raman fiber amplifier, its loss relationship is corelated with the out-of-band ASE joint loss by a mode of equalizing a fiber loss coefficient and a distance between the joint and the pump source to be a joint loss at 0 km (since the existing out-of-band ASE detection is performed on the pump laser side, i.e. at the 0 km, therefore, it is necessary to convert the associated impact into a 0 km joint loss so as to be able to be calculated together), and the process of calculating the mode field diameter joint loss $Att_{Aeff}$ is realized according to the 0 km-equivalent joint loss of the distance between the joint and the pump source and the 0 km-equivalent joint loss of the fiber loss coefficient, thus the fiber mode field diameter among factors affecting the actual gains of a Raman fiber amplifier is obtained, thus possibility for solving the actual maximum gains is provided, i.e. obtaining the actual maximum gains by comprehensively considering four impacting factors of the distance between the joint and the pump source, the fiber loss coefficient, the mode field diameter of the fibers and the fiber length. The actual maximum gain is the maximum gain that may be achieved in all input power ranges, in this way, in the aspect of transient control, the original signal of the system may be kept to operate at a fixed gain, i.e. a gain locking effect may be realized, and a fluctuation of existing transmission signal power caused by signal changes in transmission fiber link is avoided.

Wherein when solving the impact factors, the embodiments of the present disclosure may also obtain the impact factor for solving the maximum gain by pre-storing respective relationship parameters, and by interpolation, and temporarily by formula calculation and other methods, which enables the method proposed by the embodiments of the present disclosure may be realized by an existing architecture carrying a control unit.

Figure 8:
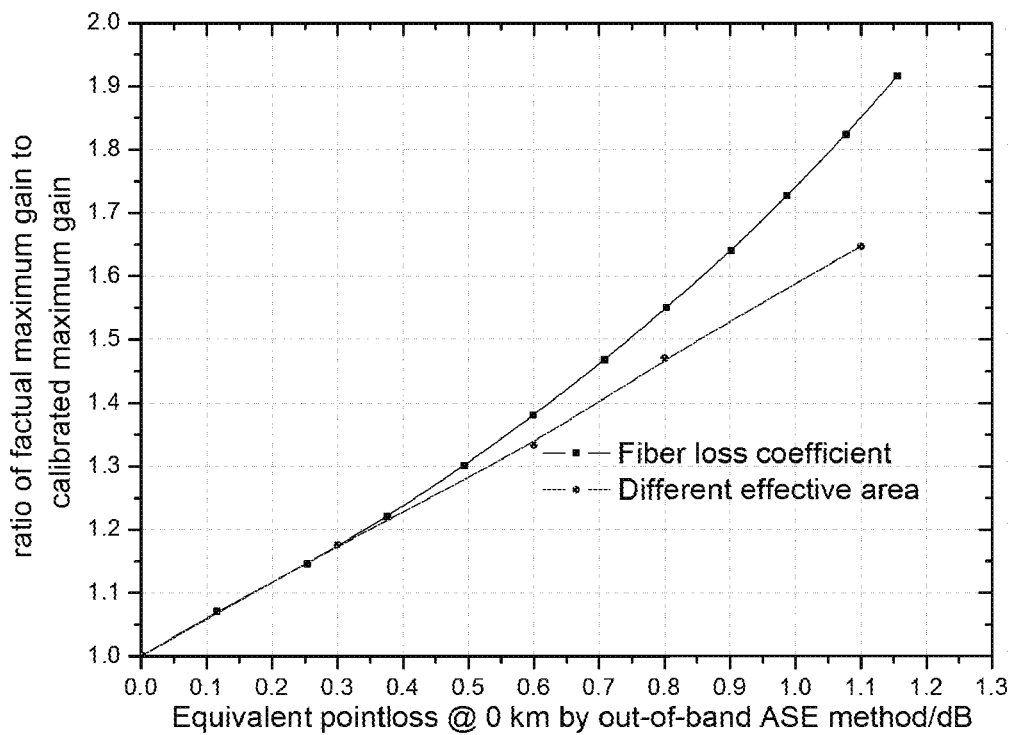
FIG. 8 is a ratio diagram of the maximum Raman gain can be achieved in a case where the equivalent joint loss is larger than 0 to the calibrated maximum Raman gain according to an embodiment of the present disclosure.

FIG. 6 and FIG. 8 illustrate fitting curve diagrams of the relationship between a 0 km joint loss value $A_{ttpoint}[i]$ equivalent to a joint loss at different positions of fiber (in the present disclosure, how to obtain the 0 km joint loss $Att_{point[i]}$ equivalent to a joint loss at different positions of fiber will be specifically described by Embodiment 3) and the maximum Raman gain (wherein the relationship is represented as a corresponding relationship between the joint loss $Att_{point[i]}$ and the impact factor, and the impact factor is obtained by dividing the actual maximum gain by the calibrated maximum gain); the relationship between the 0 km joint loss $Att_{coefficient[j]}$ equivalent to a joint loss caused by the loss coefficient of fiber (in the present disclosure, how to obtain the 0 km joint loss value $Att_{coefficient[j]}$ equivalent to a joint loss caused by the loss coefficient of fiber will be specifically described by Embodiment 4) and the maximum Raman gain; and the relationship between the 0 km joint loss value $Att_{Aeff[k]}$ equivalent to a joint loss caused by a fiber mode field diameter and the maximum Raman gain according to the embodiment of the present disclosure, wherein FIG. 6 is a diagram of ratio between the maximum Raman gain can be achieved in a case where the equivalent joint loss is less than 0 and the calibrated maximum Raman gain; FIG. 8 is a diagram of ratio between the actual maximum Raman gain can be achieved in a case where the equivalent joint loss is larger than 0 and the calibrated maximum Raman gain; the reason why the ordinate value presents the ratio of the actual maximum Raman gain to the calibrated maximum Raman gain (i.e. the impact factor value, compared to the 0 km-equivalent joint loss, the 0 km-equivalent joint loss represents the contents converted dB of difference between the calibrated maximum Raman gain and the actual maximum Raman gain), and the abscissa represents each 0 km-equivalent joint loss (including $Att_{point[i]}$, $Att_{coefficient[j]}$, and $Att_{Aeff[k]}$), is to be able to prepare, and to provide a more efficient and convenient process for looking up a corresponding impact factor. The main purpose of the present disclosure is to be able to determine the maximum gain that may be achieved over all input power ranges, in this way, in the aspect of transient control, the original signal of the system may be kept to operate at a fixed gain, and a gain locking effect may be realized.

Figure 10:
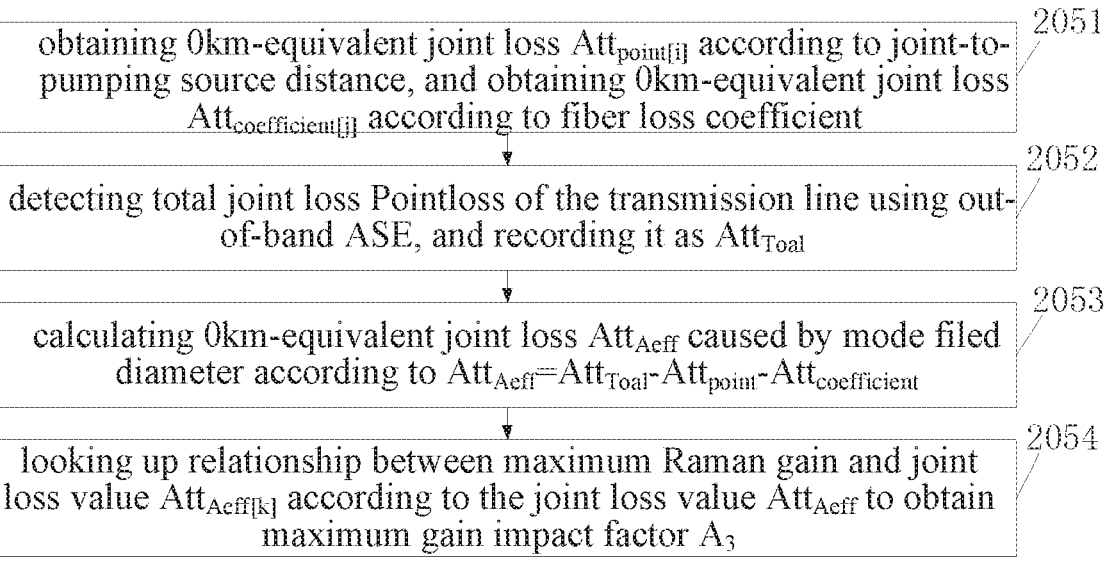
FIG. 10 is a flow diagram of calculating the joint loss value $Att_{Aeff}$ based on the fiber loss coefficient, the distance between the joint and the pump source according to an embodiment of the present disclosure.

Combined with the embodiment of the present disclosure, for calculating the joint loss $Att_{Aeff}$ according to the fiber loss coefficient, the distance between the joint and the pump source, and looking up the relationship between the joint loss $Att_{point[k]}$ and the maximum Raman gain to obtain a maximum gain impact factor $A_3$ according to the joint loss $Att_{Aeff}$ involved in step 205, the embodiment of the present disclosure further provides a specific implementation mode, as shown in FIG. 10, including:

In step 2051, obtaining the 0 km-equivalent joint loss $Att_{point[i]}$ according to the distance between the joint and the pump source; obtaining the 0 km-equivalent joint loss $Att_{coefficient[j]}$ according to the fiber loss coefficient.

Figure 11:
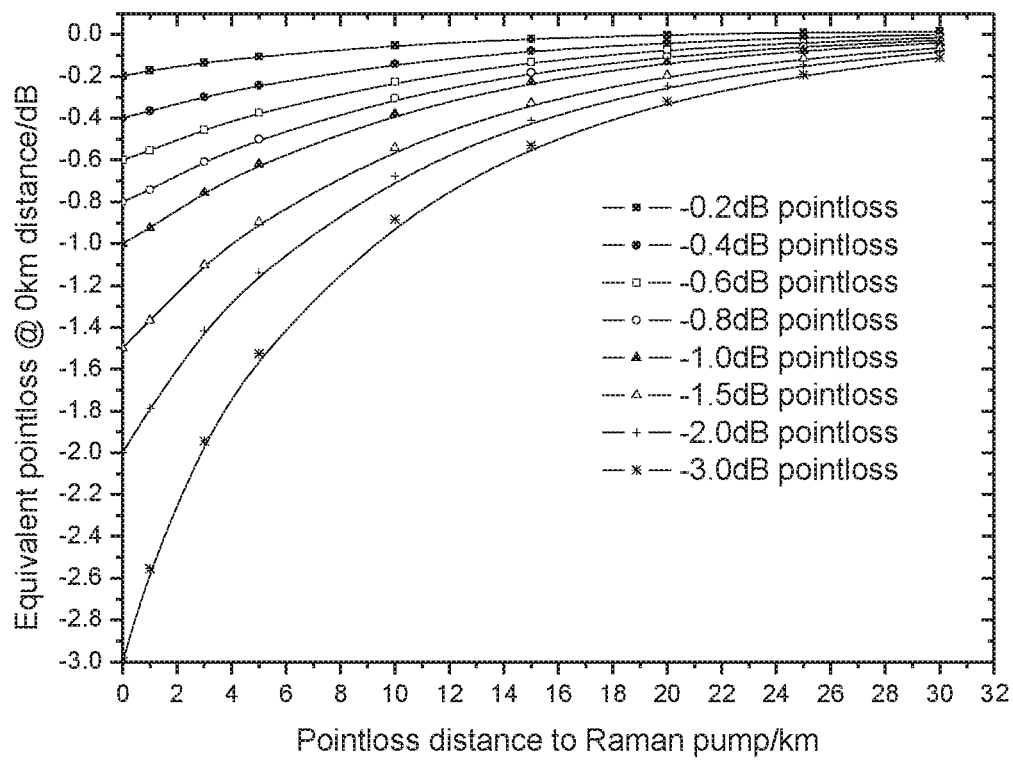
FIG. 11 is a diagram of a 0 km-equivalent joint loss equivalent to a joint loss at different positions of the fiber according to an embodiment of the present disclosure.
Figure 12:
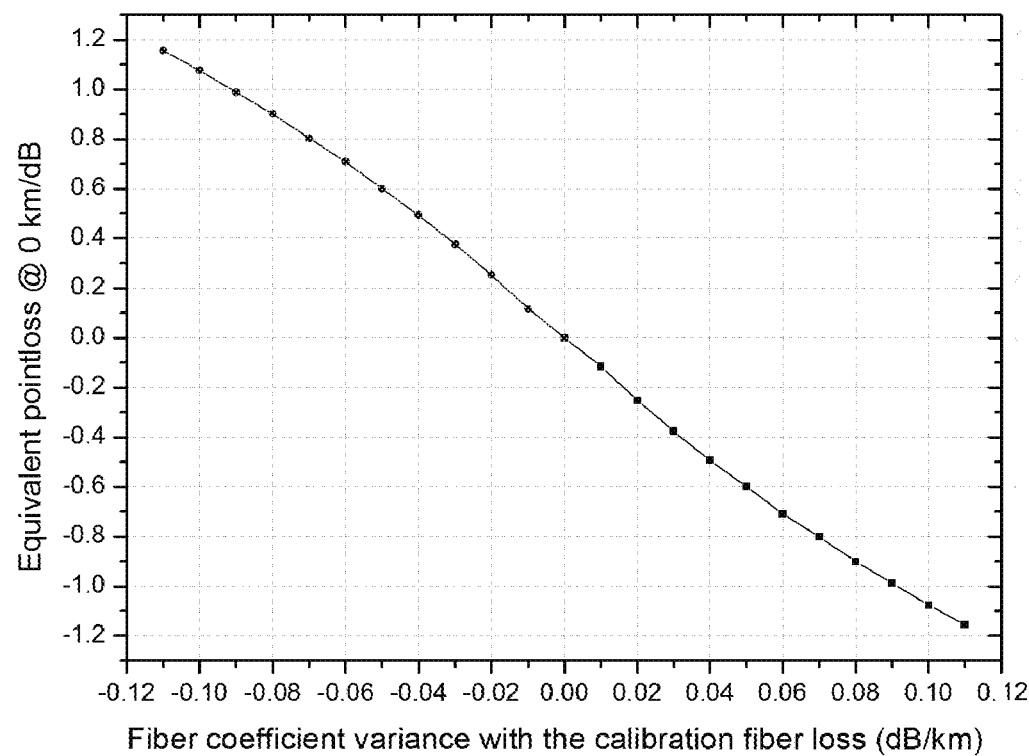
FIG. 12 is a diagram of a 0 km-equivalent joint loss for a fiber loss coefficient varying with a calibration fiber according to an embodiment of the present disclosure.

Here, the relationship between the distance between the joint and the pump source and the 0 km-equivalent joint loss $Att_{point[i]}$, similarly to the relationship between the 0 km-equivalent joint loss value $Att_{point[i]}$ and the maximum Raman gain involved in Embodiment 1 of the present disclosure, may be obtained by calculating corresponding formula (the subsequent content will be specifically described in Embodiment 3), it may also be obtained by looking up a pre-configured calculated table and/or a curve fitted on the basis of the corresponding formula. FIG. 11 illustrates a diagram of 0 km joint loss equivalent to a joint loss at different positions of fiber (i.e. the distance between the joint and the pump source), wherein the abscissa is a positional distance (whose unit is km) between the Raman pump laser and the joint, and the ordinate is the attenuation situation of the 0 km-equivalent joint loss relative to an ideal state (i.e. without any joint loss), wherein the larger the value of the negative value displayed on the ordinate, the more serious its attenuation. For the use of FIG. 11, for example, at 10 km, the joint loss measured by OTDR is −3.0 dB, then its 0 km-equivalent joint loss is represented by a corresponding "-*-" curve looked up from curves, and the value of the ordinate, i.e. the result of the 0 km-equivalent joint loss, is obtained, taking FIG. 11 as an example, this result is about −0.9 dB. In an actual operation, a plurality of joints may exist in an application environment, which, at this time, for the above-mentioned impact factors $A_1$, $A_2$, $A_3$ and $A_4$, corresponds to impact factor $A_1$ containing a plurality of sub-elements, such as $A_{1-1}$, $A_{1-2}$, ..., $A_{1-u}$, where u is the number of nodes, and the corresponding $A_1=A_{1-1}*A_{1-2}* \ldots *A_{1-u}$; and wherein each sub-element is calculated in a scenario in which each node exists independently, and its calculation method will be described in detail in Embodiment 3. FIG. 12 illustrates a diagram of 0 km-euivalent joint loss of the fiber loss coefficients, where the abscissa is an interpolation between fiber loss coefficients compared with calibrated loss coefficients, wherein when the abscissa is negative, it shows that the fiber loss coefficient is lower than the calibrated loss coefficient, and the corresponding ordinate shows that the larger the value of the positive value, the less its attenuation, conversely, the larger the value of the negative value, the larger its attenuation; and the ordinate is the attenuation situation of a 0 km-equivalent joint loss relative to an ideal state (i.e. without any joint loss), wherein the larger the value of the negative value displayed on the ordinate, the more serious its attenuation.

In step 2052, obtaining a total joint loss Pointloss of the transmission line by using the out-of-band ASE, where the total joint loss Pointloss is also recorded as $Att_{Toal}$.

An embodiment of the present disclosure provides a preferred implementation, i.e. selecting a specified pump laser pump1, calculating out-of-band ASE detection values corresponding to each output power of pump1 in a case where the total joint loss Pointloss is 0, and solving parameters k and b in the formula $0=ASE_{out-of-band}-k*P_{pump}-b$ according to the out-of-band ASE detection values corresponding to each output power; then the total joint loss Pointloss is presented as Pointloss=$(ASE_{out-of-band}-k*P_{pump}-b)/(k+1)$.

The reason why to select a specified pump laser pump1 here is that the participation of a plurality of pump lasers in the solution of parameters k and b at the same time, may lead to instability of test process, thus, lead to the accuracy of the calculated parameters k and b not high. However, the total joint loss Pointloss does not vary with the number of pump lasers, therefore, specifying a pump laser pump1 to calculate the above total joint loss Pointloss may simplify the calculation process and improve the accuracy of the calculation. Of course, it is also within the protection scope of the embodiment of the present disclosure to use a plurality of pump lasers simultaneously to calculate the total joint loss based on the idea proposed by the embodiment of the present disclosure.

In step 2053, calculating a 0 km-equivalent joint loss $Att_{Aeff}$ caused by a mode field diameter in a current fiber transmission line based on $Att_{Aeff}=Att_{Toal}-Att_{point}-Att_{coefficient}$.

In an embodiment of the present disclosure, the $Att_{point}$ and $Att_{coefficient}$ may be obtained by looking up a table as described in the following contents. Establishment of the table is specifically described in subsequent Embodiment 3 and Embodiment 4 of the present disclosure (wherein for different types (referring specifically to different fiber attenuation coefficients) of fibers used in different positions and different regions, the fiber attenuation coefficient may individually calculated in sections, and the calculation of each segment may be completed by specifically referring to Embodiment 4, and its final presentation as the impact factor $A_2$ may be completed by referring to the above example of $A_1=A_{1-1}*A_{1-2}* \ldots *A_{1-u}$, which will not be described in detail here).

In step 2054, looking up the relationship between the joint loss value $Att_{Aeff[k]}$ and the maximum Raman gain to obtain a maximum gain impact factor $A_3$ according to the joint loss value $Att_{Aeff}$.

Through the above steps 2051-2054, a conversion mechanism among $Att_{Toal}$, $Att_{point}$, $Att_{coefficient}$ and $Att_{Aeff}$ is provided, thus $Att_{Aeff}$ which is difficult to obtain, may be obtained according to $Att_{Toal}$, $Att_{point}$, $Att_{coefficient}$ which are easy to calculate, so as to solve transmission performance parameters which affect the actual amplification gain.

Referring to FIG. 6 and FIG. 8, in embodiments of the present disclosure, the relationship between the joint loss $Att_{point[i]}$ and the maximum Raman gain, the relationship between the joint loss $Att_{coefficient[j]}$ and the maximum Raman gain, and the relationship between the joint loss $Att_{Aeff[l]}$ and the maximum Raman gain, which are involved in Embodiment 1, further comprises:

obtaining an actual maximum gain according to each loss value $Att_{point[i]}$ (in Embodiment 3, how to implement is described in detail), and dividing the actual maximum gain by a calibrated maximum gain to obtain a corresponding impact factor; and establishing a corresponding relationship between each loss value $Att_{point[i]}$ and the corresponding impact factor;

obtaining an actual maximum gain according to each loss value $Att_{coefficient[j]}$ (in Embodiment 4, how to implement is described in detail), and dividing the actual maximum gain by the calibrated maximum gain value to obtain a corresponding impact factor; and establishing a corresponding relationship between each loss value $Att_{coefficient[j]}$ and the corresponding impact factor;

obtaining an actual maximum gain according to each loss value $Att_{Aeff[l]}$ (derived from Embodiment 3, Embodiment 4, and Embodiment 5 combined with the formula $Att_{Aeff}=Att_{Toal}-Att_{point}-Att_{coefficient}$ in step 2053), dividing the actual maximum gain by the calibrated maximum gain to obtain a corresponding impact factor; and establishing a corresponding relationship between each loss value $Att_{Aeff[l]}$ and the corresponding impact factor.

FIG. 6 and FIG. 8 provided by the embodiment of the present disclosure are only an image expression form of one of the plurality of expression mode of above-mentioned relationship between each loss $Att_{point[i]}$ and the corresponding impact factor, the relationship between each loss $Att_{coefficient[j]}$ and the corresponding impact factor, and the relationship between each loss $Att_{Aeff[l]}$ and the corresponding impact factor. In addition, the modes, similar to the table storage mode and the expression storage mode are all within the protection scope of the embodiment of the present disclosure.

In the embodiment of the present disclosure, for determining the actual maximum gain $G_{max\_factual}$ which may actually be achieved by the Raman fiber amplifier according to the impact factors $A_1$, $A_2$, $A_3$ and $A_4$, involved in step 206, its implementation process is described below through a specific formula derivation:

calculating an equivalent impact factor A by a formula $A=A_1*A_2*A_3*A_4$ according to the impact factors $A_1$, $A_2$, $A_3$ and $A_4$; calculating the actual maximum gain $G_{max\_factual}$ according to a formula $G_{max\_factual}=G_{max\_calibration}*A$; where $G_{max\_calibration}$ is a calibrated maximum gain of a Raman fiber amplifier, or it may also be described as the ideal maximum gain in the current state after the Raman fiber amplifier leaves the factory without considering each above-mentioned impact factor.

Figure 9:
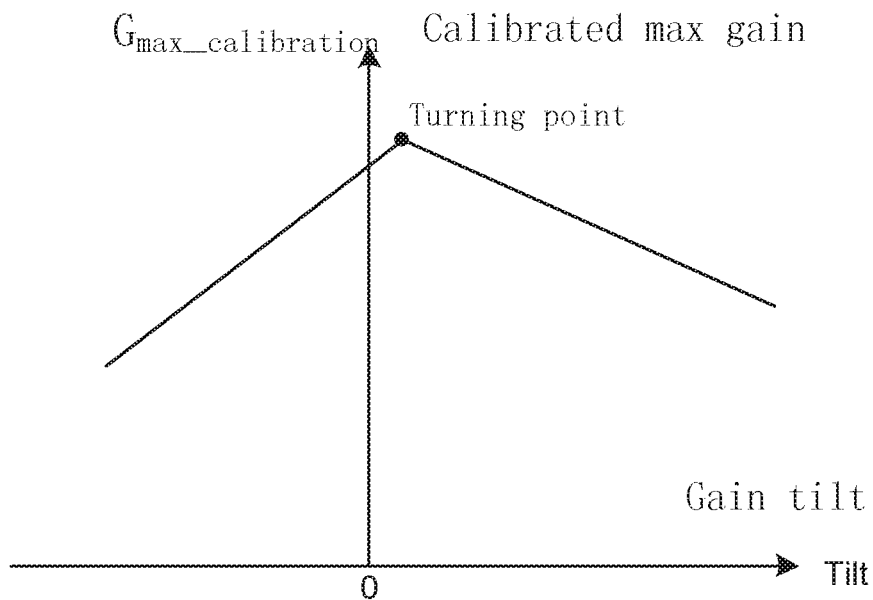
FIG. 9 is a schematic diagram of a maximum gain relationship of a Raman fiber amplifier in a case of different gain tilts according to an embodiment of the present disclosure.

Combined with the embodiment of the present disclosure, if the Raman fiber amplifier is implemented by a single pump laser, the corresponding calibrated maximum gain may be calculated according to the factory-set maximum power of the pump laser, or be directly obtained according to the calibrated maximum gain which is set when the pump laser leaves the factory. However, in the specific implementation process, the distributed Raman pump lasers are mostly used under a general application environment, therefore, the embodiment of the present disclosure further provides a method for determining the calibrated maximum gain $G_{max\_calibration}$ in the distributed Raman fiber amplifier, comprising:

establishing a relational expression between a gain tilt and the maximum gain through collecting maximum gain values of the Raman fiber amplifier under various gain tilts in advance; FIG. 9 illustrates an effect diagram presented in a manner of a graph after establishing the relational expression between the gain tilt and the maximum gain;

and looking up the above established relational expression between the gain tilt and the maximum gain and obtaining the calibrated maximum gain $G_{max\_calibration}$ through the gain tilt of the current fiber transmission line. Taking FIG. 9 as an example, to describe vividly, the calibrated maximum gain $G_{max\_calibration}$ is matched out from FIG. 9 according to the gain tilt set for the current Raman pump laser.

The presentation mode of relationship between the above gain tilt and the calibrated maximum gain in the embodiment of the present disclosure is usually stored in control unit 3 in the mode of a formula or an array, except for the icon mode shown in FIG. 9 (in the program, it is specifically presented as a data table), because of lower complexity of its formula, it has higher performance compared with the mode of establishing an array and looking up a table, therefore, the establishing the formula between the gain tilt and the maximum gain is described in a mode of establishing a relational expression, further comprises:

When $Tilt < Tilt_{turning\ point}$, $$G_{max\_calibration}=k_{01}*Tilt+b_{01};$$

When $Tilt \geq Tilt_{turning\ point}$, $$G_{max\_calibration}=k_{02}*Tilt+b_{02};$$

Where the $k_{01}$, $k_{02}$, $b_{01}$ and $b_{02}$ are correlation coefficients, which may be calculated by calibration or fitting the curve as shown in FIG. 9.

Then looking up the above established relational expression between gain tilt and maximum gain and obtaining the calibrated maximum gain $G_{max\_calibration}$ according to the gain tilt of the current fiber transmission line, further comprises:

substituting a Tilt setting value into a corresponding formula of the above two formulas, and obtaining the calibrated maximum gain $G_{max\_calibration}$.

The embodiment of the present disclosure also provides a implementation method for a 0 km joint loss $Att_{point[i]}$ equivalent to a joint loss at different positions of one or more types of fibers, including:

the value $Att_{point}$ is obtained by establishing in a control unit a table of 0 km-equivalent joint loss varying with a position in the fibers (The table of 0 km-equivalent joint loss may be established by the method for solving the $Att_{point}$ introduced in Embodiment 3), and then obtaining a 0 km-equivalent joint loss value for a position in the fiber by looking up the table and interpolation.

The embodiment of the present disclosure also provides a specific implementation method for 0 km-equivalent joint loss value $Att_{coefficient[j]}$ equivalent to a joint loss at different positions of one or more types of fibers, including:

the value $Att_{coefficient}$ is obtained by establishing in a control unit a table of 0 km-equivalent joint loss varying with a calibrated loss coefficient of the fibers (The table of 0 km-equivalent joint loss may be established by the method for solving the $Att_{coefficient}$ introduced in Embodiment 4), and then obtaining a 0 km-equivalent joint loss value for a fiber loss coefficient by looking up the table and interpolation.

Figure 13:
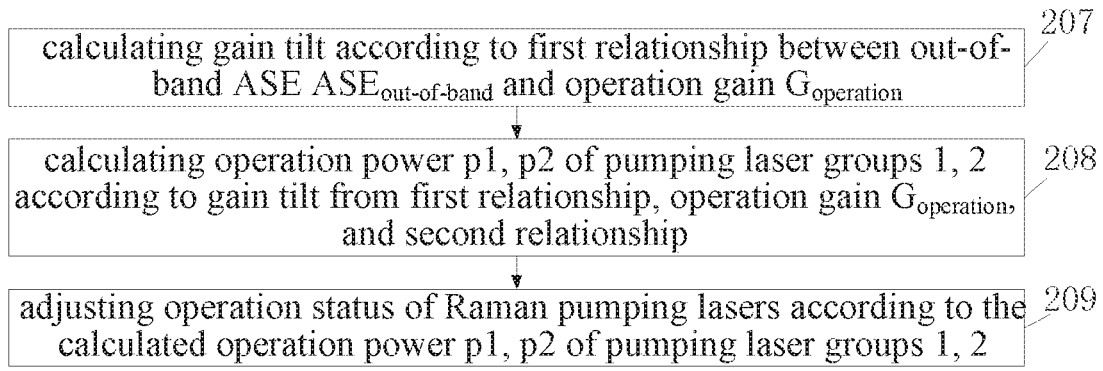
FIG. 13 is a flow chart of a method for adjusting a distributed pump laser based on the out-of-band ASE according to an embodiment of the present disclosure.

Combined with the embodiment of the present disclosure, after obtaining the actual maximum gain $G_{max\_factual}$, there also is a preferred extended solution. Specifically, when a gain value is selected as the current operating gain $G_{operation}$ according to the $G_{max\_factual}$, and the scenario used by the current method is a distributed Raman pump amplifier, as shown in FIG. 13, the method further includes:

In step 207, calculating a gain tilt according to a first relational expression between the out-of-band $ASE_{out-of-band}$ and the operating gain $G_{operation}$, where the first relational expression is $ASE_{out-of-band} + \Delta ASE = k_1 * G_{operation} + k_2 * Tilt + b_1 + Att_{point}$.

Wherein $k_1$ is a tilt factor of the linear relationship between the out-of-band ASE power (dBm) and the gain (dB), $K_2$ is a tilt factor of the linear relationship between the out-of-band ASE power (dBm) and the gain tilt (dB), and $b_1$ is an intercept; the $k_1$, $k_2$ and $b_1$ are obtained by calibration, and the correction quantity $\Delta ASE$ of target ASE, specifically is: when the fiber length is $\geq 100$ km, $\Delta ASE = 0$; when the fiber length is less than 100 km, $\Delta ASE$ is determined according to look-up table or interpolation or function fitting. It should be noted that the fiber length of 100 km is only a preferred critical value provided by the embodiment of the present disclosure, in an actual operation process, due to the difference of energy conversion efficiency between a pump light and a signal light caused by difference of fiber materials, its critical length may also be adjusted on the 100 km, and the adjusted technical solution of corresponding fiber length critical value based on the inventive concept of the present disclosure is also within the protection scope of the present disclosure.

In step 208, calculating operating power $p_1$ of a pump laser group 1 and operating power $p_2$ of the pump laser group 1, according to the gain tilt calculated based on the first relational expression and the operating gain $G_{operation}$, and according to a second relational expression, where the second relational expression is $p_1/p_2 = k_3 * G_{operation} + k_4 * Tilt + b_2$.

Where $p_1$ is output power of the pump laser group 1, $p_2$ is output power of the pump laser group 2, $k_3$ is a tilt factor linearly related to the amplifier gain G (whose unit is dB), and $k_4$ is a tilt factor linearly related to the gain Tilt (whose unit is dB), $b_2$ is an intercept, and $k_3$, $k_4$ and $b_2$ are all obtained by calibration.

In step 209, adjusting an operating state of the Raman pump laser based on the calculated operating power $p_1$ of the pump laser group 1 and the calculated operating power $p_2$ of the pump laser group 1.

Figure 14:
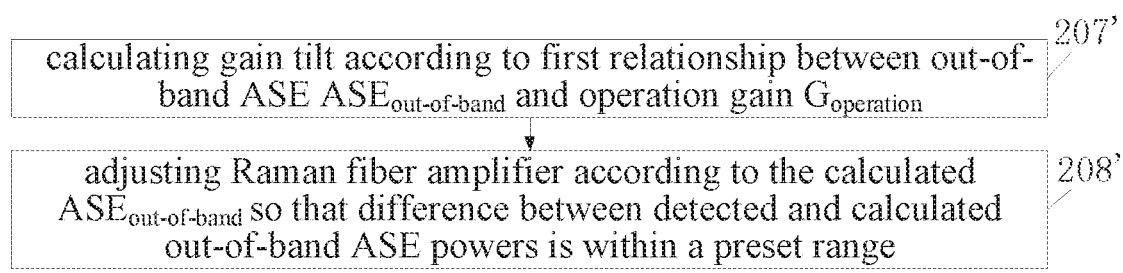
FIG. 14 is a flow chart of a method for adjusting a single pump laser based on the out-of-band ASE according to an embodiment of the present disclosure.

Combined with the embodiment of the present disclosure, after obtaining the actual maximum gain $G_{max\_factual}$, there also is a preferred extended solution, specifically, when a gain value is selected as the current operating gain $G_{operation}$ according to the $G_{max\_factual}$, unlike the above method, the scenario using the current method is a single Raman pump amplifier, as shown in FIG. 14, the method further includes:

In step 207', calculating a gain tilt according to a first relational expression between the out-of-band $ASE_{out-of-band}$ and the operating gain $G_{operation}$, wherein the out-of-band $ASE_{out-of-band}$ is obtained by an actual detection, and the first relational expression is:

$ASE_{out-of-band} + \Delta ASE = k_1 * G_{operation} + b_1 + Att_{point}$;

where $k_1$ is a tilt factor of the linear relationship between the out-of-band ASE power and the gain, $k_2$ is a tilt factor of the linear relationship between the out-of-band ASE power and the gain tilt, and $b_1$ is an intercept; the $k_1$, $k_2$ and $b_1$ are obtained by calibration, $\Delta ASE$ is a correction quantity of ASE associated with the fiber length;

In step 208', adjusting the Raman fiber amplifier according to the calculated out-of-band $ASE_{out-of-band}$, so that the detected out-of-band ASE power differs from the calculated out-of-band $ASE_{out-of-band}$ by a preset distance.

Embodiment 2

Figure 15:
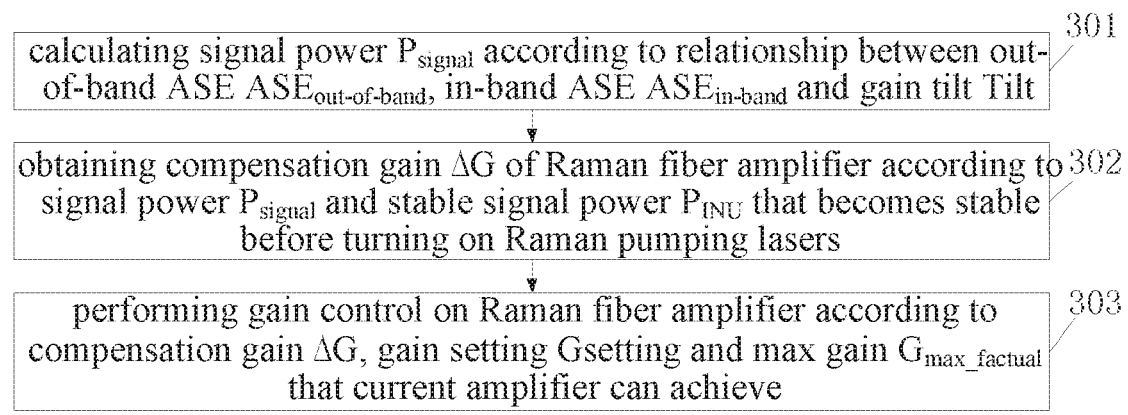
FIG. 15 is a flow chart of a method for controlling an automatic gain of a Raman fiber amplifier according to an embodiment of the present disclosure.

After a method for determining a maximum gain of a Raman fiber amplifier is proposed in Embodiment 1 of the present disclosure, an embodiment of the present disclosure further provides a method for controlling an automatic gain of a Raman fiber amplifier by using the maximum gain calculated in Embodiment 1, and before performing the method according to the embodiment of the present disclosure, it is necessary to firstly obtain the actual maximum gain $G_{max\_factual}$ that may be achieved by the current amplifier, where the $G_{max\_factual}$ may be obtained by the method described in Embodiment 1. As shown in FIG. 15, the method of the embodiment of the present disclosure comprises:

In step 301, calculating a signal power $P_{signal}$ by using a linear relationship among the out-of-band ASE optical power $ASE_{out-of-band}$, the in-band ASE optical power $ASE_{in-band}$ and the gain tilt Tilt.

Wherein the execution environment of step 301 is to adjust the pump laser operation according to the setting gain $G_{setting}$ set by a user after the Raman fiber amplifier enters the normal operating state, and then detect the out-of-band ASE optical power $ASE_{out-of-band}$.

In step 302, obtaining a compensation gain $\Delta G$ of the Raman fiber amplifier according to the signal power $P_{signal}$ and stable signal power $P_{INU}$ before the Raman pump laser is turned on.

Wherein the gain actually obtained by the amplifier is achieved by the obtained signal power $P_{signal}$ subtracting the stable signal power $P_{INU}$ before the Raman pump laser is turned on, $G_{factual} = P_{signal} - P_{INU}$.

The compensation gain of the Raman fiber amplifier $\Delta G = G_{operation} - G_{factual}$.

In step 303, performing gain control of the Raman fiber amplifier according to the compensation gain $\Delta G$, the setting gain $G_{setting}$, and the actual maximum gain $G_{max\_factual}$ that the current amplifier may achieve.

The embodiment of the present disclosure provides two reference dimensions of the maximum gain and the actual gain that the current amplifier may achieve for gain control, and provides a reference angle for automatic gain control of the Raman fiber amplifier, and proposes the compensation gain $\Delta G$, therefore, compared with a case in the prior art where a power amplification is only detected through the out-of-band ASE, it may achieve more accurate control. And compared with the equal-step adjustment method commonly adopted in the prior art, since the maximum gain value that may be finally and actually obtained, has already been calculated in the embodiment of the present disclosure, accordingly, the purpose of adjusting gain control of the Raman fiber amplifier according to the setting gain and the actual gain may be quickly achieved.

In the embodiment of the present disclosure, an implementation mode is also provided for performing gain control of the Raman fiber amplifier according to the compensation gain $\Delta G$, the setting gain $G_{setting}$, and the actual maximum gain $G_{max\_factual}$ that the current amplifier may achieve involved in step 303, including:

Determining the operating gain $G_{operation}$, according to a comparison between the actual maximum gain $G_{max\_factual}$ and the setting gain $G_{setting}$, if the setting gain $G_{setting}$ is less than the actual maximum gain $G_{max\_factual}$, the operating gain $G_{operation}$ is set to be the setting gain $G_{setting} + \Delta G$; if the setting gain $G_{setting}$ is larger than the actual maximum gain $G_{max\_factual}$, and $\Delta G$ is positive, the operating gain $G_{operation}$ is set to be the actual maximum gain $G_{max\_factual}$ that may be actually achieved (the reason is that if the calculated $\Delta G$ is positive, it is impossible to further increase the parameter value of the actual maximum gain $G_{max\_factual}$), if the setting gain $G_{setting}$ is larger than the actual maximum gain $G_{max\_factual}$, and $\Delta G$ is negative, the operating gain $G_{operation}$ is set to be the actual maximum gain that may be actually achieved $G_{max\_factual}-\Delta G$.

Figure 16:
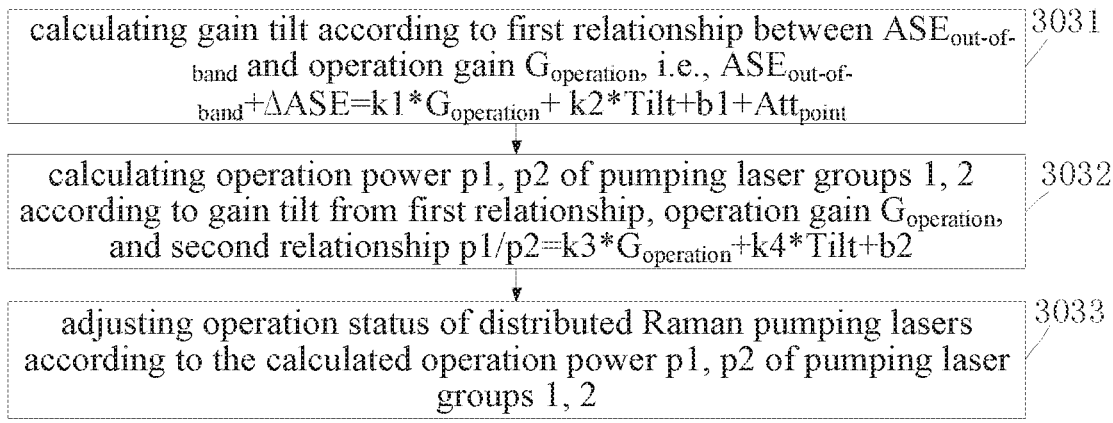
FIG. 16 is a flow chart of a specific method for controlling and regulating a pump amplifier group in a method for controlling an automatic gain of a Raman fiber amplifier according to an embodiment of the present disclosure.

Combined with the embodiment of the present disclosure, for the operating gain $G_{operation}$ being set to be the setting gain $G_{setting}+\Delta G$ or the maximum gain $G_{max\_factual}$, a specific method is also provided in the embodiment of the present disclosure, in the distributed Raman pump amplifier, it is implemented as shown in FIG. 16, including:

In step 3031, calculating a gain tilt according to a first relational expression between the out-of-band $ASE_{out-of-band}$ and the operating gain $G_{operation}$, wherein the first relational expression is $ASE_{out-of-band}+\Delta ASE=k_1*G_{operation}+k_2*Tilt+b_1+Att_{point}$.

Wherein $k_1$ is a tilt factor of the linear relationship between the out-of-band ASE power (dBm) and the gain (dB), $K_2$ is a tilt factor of the linear relationship between the out-of-band ASE power (dBm) and the gain tilt (dB), and $b_1$ is an intercept; the $k_1$, $k_2$ and $b_1$ are obtained by calibration, and for a correction quantity $\Delta ASE$ of target ASE, when the fiber length is $\geq 100$ km, $\Delta ASE=0$; when the fiber length is <100 km, $\Delta ASE$ is determined according to a look-up table or interpolation or function fitting.

In step 3032, calculating operating power $p_1$ of a pump laser group 1 and operating power $p_2$ of the pump laser group 1 according to the gain tilt calculated based on the first relational expression and the operating gain $G_{operation}$, and according to a second relational expression, wherein the second relational expression is $p_1/p_2=k_3*G_{operation}+k_4*Tilt+b_2$.

Where $p_1$ is output power of the pump laser group 1, $p_2$ is output power of the pump laser group 2, $k_3$ is a tilt factor linearly related to the amplifier gain G (whose unit is dB), and $k_4$ is a tilt factor linearly related to the gain tilt Tilt (whose unit is dB), $b_2$ is an intercept, and $k_3$, $k_4$ and $b_2$ are all obtained by calibration.

In step 3033, adjusting an operating state of a Raman pump laser based on the calculated operating power $p_1$ of the pump laser group 1 and the calculated operating power $p_2$ of the pump laser group 1.

Figure 17:
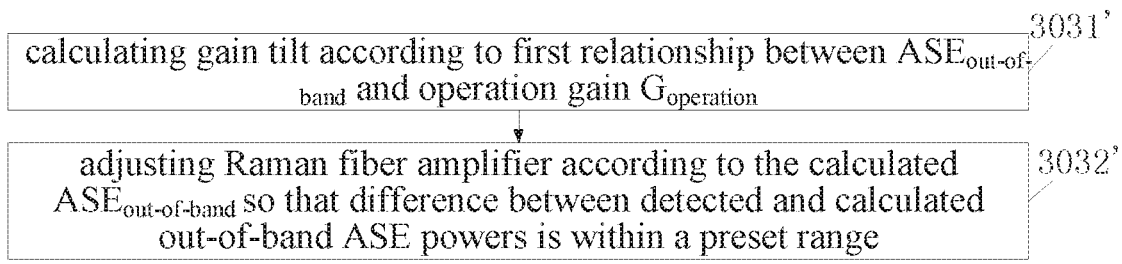
FIG. 17 is a flow chart of a method for controlling and regulating a single pump amplifier in a method for controlling an automatic gain of a Raman fiber amplifier according to an embodiment of the present disclosure.

Combined with the embodiment of the present disclosure, for the operating gain $G_{operation}$ being set to be the setting gain $G_{setting}+\Delta G$ or the maximum gain $G_{max\_factual}$, a specific method is also provided in the embodiment of the present disclosure, in the single Raman pump amplifier, which is implemented as shown in FIG. 17, including:

In step 3031', calculating a gain tilt according to a first relational expression between an out-of-band $ASE_{out-of-band}$ and an operating gain $G_{operation}$, wherein the out-of-band $ASE_{out-of-band}$ is obtained by an actual detection, and the first relational expression is:

$$ASE_{out-of-band}+\Delta ASE=k_1*G_{operation}+b_1+Att_{point};$$

where $k_1$ is a tilt factor of the linear relationship between the out-of-band ASE power and the gain, $k_2$ is a tilt factor of the linear relationship between the out-of-band ASE power and the gain tilt, and $b_1$ is an intercept; the $k_1$, $k_2$ and $b_1$ are obtained by calibration, $\Delta ASE$ is a correction quantity of ASE associated with the fiber length;

In step 3032', adjusting the Raman fiber amplifier according to the calculated out-of-band $ASE_{out-of-band}$, so that the detected out-of-band ASE power differs from the calculated out-of-band $ASE_{out-of-band}$ by a preset distance.

Wherein the preset distance may be set according to experience, and is usually set in consideration of the detection accuracy and the size of parameter value.

In embodiment of the present disclosure, for calculating signal power $P_{signal}$ by using a linear relationship among the out-of-band ASE optical power $ASE_{out-of-band}$, the in-band ASE optical power $ASE_{in-band}$ and the gain tilt Tilt involved in step 301, it is described in detail in the embodiment of the present disclosure, including:

calculating $ASE_{in-band}$ according to a formula $ASE_{in-band}=k_5*ASE_{out-of-band}+k_6*Tilt+(k_5-1)*Att_{point}+b$.

Then, calculating signal power $P_{signal}$ according to a formula $P_{signal}=10*\log_{10}(P_{total}-10^{\wedge}(ASE_{in-band}/10))$.

where total $P_{total}$ is total power of the detected in-band optical signal, $k_5$ is a proportional coefficient of the linear relationship, $k_6$ is an impact factor on the original in-band and out-band relationship in a case of different gain tilts, and b is an intercept.

According to the embodiment of the disclosure, considering that the gain control accuracy is limited in an actual adjustment process, therefore, in theory, the current gain adjustment may be stopped as long as the difference between the current control operation for adjusting gain and the actually calculated gain result meets a preset gain accuracy requirement, and on the contrary, when $\Delta G=G_{operation}-G_{factual}$ exceeds the gain accuracy control requirement, $G_{operation}$ is the calculated target gain G, and $\Delta G+G_{factual}$ is set as a new gain G control quantity to perform iterative calculation, thereby realizing a feedback control; wherein the current actual gain $G_{factual}$ of the Raman fiber amplifier is obtained by the signal power $P_{signal}$ subtracting the stable signal power $P_{INU}$ before the Raman pump laser is turned on, i.e. $G_{factual}=P_{signal}-P_{INU}$.

In the embodiment of the present disclosure, a preferred implementation mode is provided for obtaining $Att_{point}$, specifically, the value $Att_{point}$ is obtained by establishing in a control unit a table of 0 km-equivalent joint loss varying with a position in the fiber and then obtaining a 0 km-equivalent joint loss value for a position in the fiber by looking up the table and interpolation. The specific operation process may refer to relevant description in Embodiment 1, and will not be described in detail here.

Embodiment 3

Figure 18:
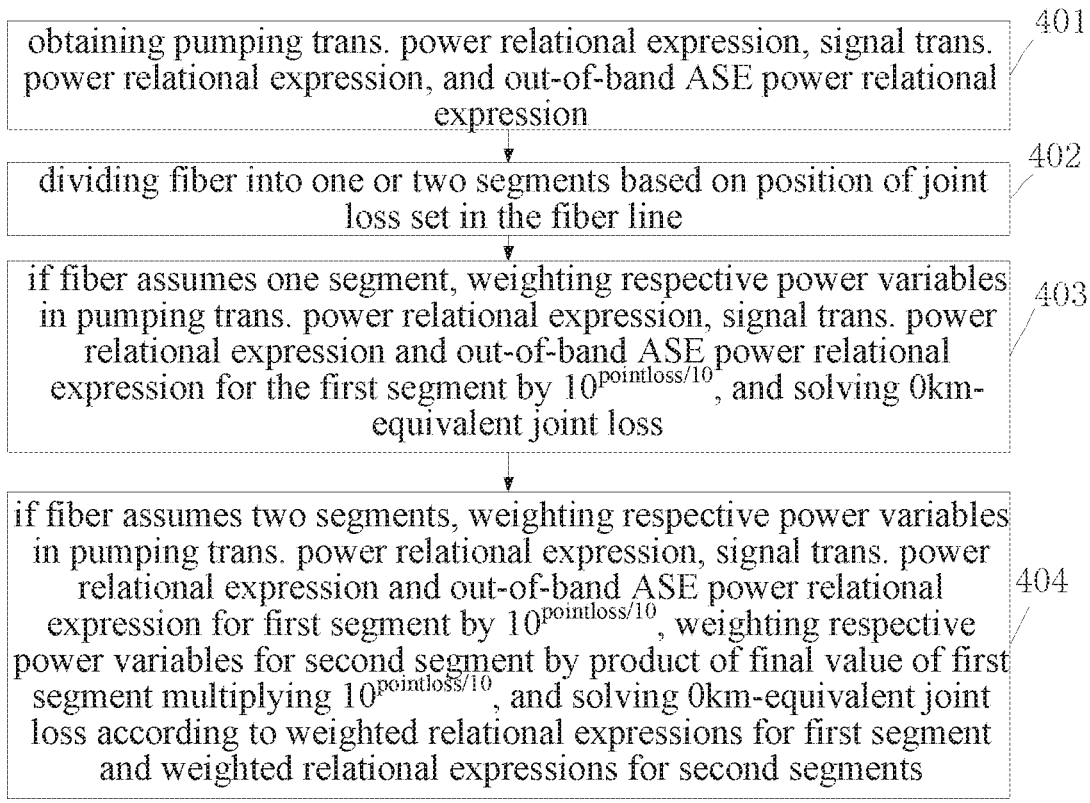
FIG. 18 is a flow chart of a method for determining a 0 km-equivalent joint loss of a fiber node in a Raman fiber amplifier according to an embodiment of the present disclosure.

The embodiment of the present disclosure also provides a method for determining a 0 km-equivalent joint loss of fiber node in a Raman fiber amplifier, i.e. a 0 km joint loss equivalent according to a distance between a joint and a pump source. The determining method proposed in the embodiment of the present disclosure may be operated by a third-party computer, and the obtained data result may be imported into control unit 3 involved in the embodiments of the present disclosure, and the determining method described in the embodiment of the present disclosure may also be directly performed by the control unit 3, which is not particularly limited here. As described in FIG. 18, the determining method comprises:

In step 401, obtaining a pump transmission power relational expression, a signal transmission power relational expression and an out-of-band ASE power relational expression.

Wherein the pump transmission power relational expression, the signal transmission power relational expression and the out-of-band ASE power relational expression may be converted into a code program and stored on a third-party computer in advance, for example, the embodiment of the present disclosure provides a feasible mode to organize the pump transmission power relational expression, the signal transmission power relational expression and the out-ofband ASE power relational expression into a format supported by a numerical solution of ordinary differential equation in Matlab and store in a memory of a third-party computer.

In step 402, dividing a fiber into one or two segments according to a joint loss position set in a fiber line; wherein when the joint loss position is at the starting point of the fiber, the fiber assumes one segment; when the starting point of the fiber is different from the joint loss position by a preset distance, the fiber assumes two segments, and the joint loss position is taken as the demarcation point of two sections of fiber.

The joint loss set at different positions can be generally classified into two types, one of which is that the joint loss is set at the starting point of the fiber, presenting that the above fiber is one section; and the other type of which is that the joint loss is set at a non-starting position of the fiber, at this time, according to the position setting the joint loss, the entire fiber is divided into two segments: the first segment is from the starting point of the fiber to the setting position of the joint loss, and the second segment is from the setting position of the joint loss to the end of the fiber.

In step 403, if the fiber is present as a segment, respective power variables in the pump transmission power relational expression, the signal transmission power relational expression and the out-of-band ASE power relational expression for the first segment of the fiber being weighted by a weighting value $$10^{\frac{pointloss}{10}},$$

solving the out-of-band ASE power value; and substituting the out-of-band ASE power value into a relational expression between the out-of-band ASE power and a 0 km-equivalent joint loss to obtain the 0 km-equivalent joint loss;

Wherein in other embodiments, the 0 km-equivalent joint loss is also marked as $Att_{point}$.

In step 404, if the fiber is present as two segments, respective power variables in the pump transmission power relational expression, the signal transmission power relational expression and the out-of-band ASE power relational expression for the first segment of the fiber being weighted by a weighting value $$10^{\frac{pointloss}{10}},$$

and respective power variables for the second segment being weighted by a weighting value that is a product of a final value of the power variables in the first segment multiplying $$10^{\frac{pointloss}{10}};$$

solving the out-of-band ASE power value according to the weighted relational expressions of the first and second segments; and substituting the out-of-band ASE power value into the relational expression between the out-of-band ASE power and the 0 km-equivalent joint loss to obtain the 0 km-equivalent joint loss.

Wherein the relational expression between the out-of-band ASE power and the 0 km-equivalent joint loss is: Pointloss=$(ASE_{out-of-band}-k*P_{pump}-b)/(k+1)$, k is a tilt of the linear relationship, b is an intercept of the straight line. In the embodiment of the present disclosure, it corresponds to a reuse of calculation formula for calculating the total joint loss involved in Embodiment 1, however, the difference is that the computing environment set up by the embodiment of the present disclosure is only for a method for determining the 0 km-equivalent joint loss of a fiber node (i.e. a distance between the joint and the pump source), at this time, impacts of fiber attenuation coefficients and fiber mode field diameters will be eliminated, i.e. Pointloss at this time is the 0 km-equivalent joint loss of fiber node.

Wherein solving the relational expression between the out-of-band ASE power and the 0 km-equivalent joint loss further comprises:

selecting a specified pump laser pump1, calculating out-of-band ASE detection values corresponding to each output power of the pump1 when the joint loss Pointloss is 0, and solving corresponding parameters k and b in a formula $0=ASE_{out-of-band}-k*P_{pump}-b$ according to the out-of-band ASE detection values corresponding to each output power; then presenting the joint loss Pointloss as Pointloss= $(ASE_{out-of-band}-k*P_{pump}-b)/(k+1)$.

The embodiment of the present disclosure provides an implementation method for calculating a 0 km-equivalent joint loss when a joint loss is set at a specific position. Through the method provided by the embodiment of the disclosure, a curve diagram as shown in FIG. 11 may be depicted after setting sufficient joint loss positions and calculating 0 km-equivalent joint loss of each set joint loss position. Through the calculation method described in the embodiment of the present disclosure, a table of 0 km-equivalent joint loss varying with a position in the fiber involved in each embodiment of the present disclosure may be calculated and established.

In the embodiment of the present disclosure, the pump transmission power relational expression further comprises:

a first pump light transmission power relational expression:

$$\frac{dP_0(z)}{dz} = \alpha_0 P_0(z) + \sum_{k=1}^{n} \frac{g_{0k}}{A_{eff}} P_0(z) P_k(z),$$

where $\alpha_0$ is a transmission loss of a wavelength corresponding to the pump $P_0$, $$\frac{g_{0k}}{A_{eff}}$$

is a Raman gain coefficient from the pump $P_0$ to the pump $P_k$ (or from the pump $P_0$ to the signal $P_k$), a second pump light transmission power relational expression:

$$\frac{dP_i(z)}{dz} = \alpha_i P_i(z) - \sum_{j=0}^{i-1} \frac{g_{ji}}{A_{eff}} P_i(z) P_j(z) + \sum_{k=i+1}^{n} \frac{g_{ik}}{A_{eff}} P_i(z) P_k(z),$$

where $\alpha_i$ is a transmission loss of a wavelength corresponding to the pump $$P_i, \frac{g_{ji}}{A_{eff}}$$

is a gain coefficient between the pump $P_i$ and the pump $$P_j, \frac{g_{ik}}{A_{eff}}$$

is gain coefficient between the pump $P_i$ and the pump or signal $P_k$ (or the pump $P_i$ and the signal $P_k$);

weighting the power variables in the pump transmission power relational expression by a weighting value $$10^{\frac{pointloss}{10}},$$

comprising replacing the variables $P_0(Z)$ and $P_i(Z)$ at a right side of the first and second pump light transmission power relational expressions by $$P_0(z) \times 10^{\frac{Pointloss}{10}} \text{ and } P_i(z) \times 10^{\frac{Pointloss}{10}},$$

respectively. The transformed formula are as follows:

$$\frac{dP_0(z)}{dz} = \alpha_0 P_0(z) \times 10^{\frac{pointloss}{10}} + \sum_{k=1}^{n} \frac{g_{0k}}{A_{eff}} P_0(z) P_k(z) \times 10^{\frac{pointloss}{10}} \quad \text{(I)}$$

$$\frac{dP_i(z)}{dz} = \alpha_i P_i(z) \times 10^{\frac{pointloss}{10}} - \quad \text{(II)}$$

$$\sum_{j=0}^{i-1} \frac{g_{ji}}{A_{eff}} P_i(z) P_j(z) \times 10^{\frac{pointloss}{10}} + \sum_{k=i+1}^{n} \frac{g_{ik}}{A_{eff}} P_i(z) P_k(z) \times 10^{\frac{pointloss}{10}}$$

In the embodiment of the present disclosure, the signal transmission power relational expression further comprises:

$$\frac{dP_n(z)}{dz} = -\alpha_n P_n(z) + \sum_{j=0}^{n-1} \frac{g_{jn}}{A_{eff}} P_n(z) P_j(z),$$

where $\alpha_n$ is an attenuation coefficient of the n-th signal wavelength $$\frac{g_{jn}}{A_{eff}}$$

is a gain coefficient between the j-th pump and the n-th signal, $P_n$ is power of the n-th signal, $P_j(z)$ is power of the j-th signal or pump with a wavelength less than the n-th signal wavelength;

weighting the power variables in the signal transmission power relational expression by a weighting value $$10^{\frac{pointloss}{10}}$$

comprising replacing the variable $P_n(z)$ at a right side of the signal transmission power relational expression by $$P_n(z) \times 10^{\frac{pointloss}{10}}.$$

The transformed formula is as follows:

$$\frac{dP_n(z)}{dz} = -\alpha_n P_n(z) \times 10^{\frac{pointloss}{10}} + \sum_{j=0}^{n-1} \frac{g_{jn}}{A_{eff}} P_n(z) P_j(z) \times 10^{\frac{pointloss}{10}} \quad \text{(III)}$$

In the embodiment of the present disclosure, the out-of-band ASE power relational expression further comprises:

$$\frac{dP_{ASE}(z)}{dz} =$$

$$-\alpha_{ASE} P_{ASE}(z) + \sum_{i=0}^{n} \frac{g_{i-ASE}}{A_{eff}} P_i(z) \left( P_{ASE}(z) + h\nu \left( 1 + \frac{1}{\exp\left(\frac{h\Delta\nu}{KT}\right) - 1} \right) \right),$$

where $P_{ASE}(z)$ is the out-of-band ASE power of the frequency v varying with the distance z, $\alpha_{ASE}$ is an attenuation coefficient of the out-of-band ASE at a certain frequency, $$\frac{g_{i-ASE}}{A_{eff}}$$

is a gain coefficient from the i-th pump to the out-of-band ASE of the frequency v, h is the Planck's constant, v is the frequency of the out-of-band ASE, K is the Boltzmann constant, T is the ambient temperature, $\Delta v$ is the frequency shift from the pump light frequency to the out-of-band ASE, $P_i(z)$ is the power value of the i-th pump;

$$\frac{dP_{ASE}(z)}{dz} =$$

$$-\alpha_{ASE} P_{ASE}(z) + \sum_{i=0}^{n} \frac{g_{i-ASE}}{A_{eff}} P_i(z) \left( P_{ASE}(z) + h\nu \left( 1 + \frac{1}{\exp\left(\frac{h\Delta\nu}{KT}\right) - 1} \right) \right)$$

weighting the power variables in the out-of-band ASE power relational expression by a weighting value $$10^{\frac{pointloss}{10}}$$

comprising replacing the variable $P_n(Z)$ at a right side of the out-of-band ASE power relational expression by $$P_n(z) \times 10^{\frac{pointloss}{10}}.$$

The transformed formula is as follows:

$$\frac{dP_{ASE}(z)}{dz} = -\alpha_{ASE} P_{ASE}(z) \times 10^{\frac{Pointloss}{10}} + \sum_{i=0}^{n} \frac{g_{i-ASE}}{A_{eff}} P_i(z) \left( P_{ASE}(z) \times 10^{\frac{Pointloss}{10}} + h\nu \left( 1 + \frac{1}{\exp\left(\frac{h\Delta\nu}{KT}\right) - 1} \right) \right) \quad (IV)$$

In the embodiment of the present disclosure, the 0 km-equivalent joint loss of joints set at different positions may be solved through steps 401-404; however, it can be found from the related description of Embodiment 1 and the pump transmission power relational expression, the signal transmission power relational expression and the out-of-band ASE power relational expression, that impact of the fiber length and the fiber attenuation coefficient are simultaneously involved in each relational expression, therefore, in order to improve accuracy of calculation results of the embodiment of the present disclosure, preferably, the fiber attenuation coefficient in the pump transmission power relational expression, the signal transmission power relational expression and the out-of-band ASE power relational expression is set as a calibration value (for example: $\alpha_0$ is set as 0.25 dB/km, $\alpha_i$ is set as 0.25 dB/km, $\alpha_n$ is set as 0.2 dB/km, and $\alpha_{ase}$ is set as 0.2 dB/km); the fiber length is set to be larger than 100 km.

In the embodiment of the present disclosure, the solving the 0 km-equivalent joint loss further comprises: in the above formulas (I), (II), (III) and (IV), formulas (I) and (II) take power change of each pump laser on the transmission line as the subject of solution, which reflects relational expressions that optical power of each pump laser is affected by other pump lasers and signal optical power on the transmission line; and formula (III) takes power change of signal light on the transmission line as the subject of solution, which reflects a relational expression that signal optical power is affected by other pump lasers and signal optical power on the transmission line; the final formula (IV) takes the out-of-band ASE power as the subject of solution, which reflects the result that the out-of-band ASE is affected by optical power of each pump laser, and which directly relates to formulas (I) and (II), however, formula (III) also affects parameter factor of signal optical power in formulas (I) and (II), therefore, in the embodiment of the present disclosure, the out-of-band ASE power is solved based on the correlated relationship between the above formulas (I), (II), (III), and (IV). Thus, the out-of-band ASE power may be substituted into the relational expression between the out-of-band ASE power and the 0 km-equivalent joint loss, specifically, Pointloss=$(ASE_{out-of-band} - k*P_{pump} - b)/(k+1)$, where k is a tilt of the linear relationship, b is an intercept of the straight line. In a case where there is only one variable Pointloss, the 0 km-equivalent joint loss is solved.

In the embodiment of the present disclosure, one of the effective means for solving the above obtained pump transmission power relational expression, signal transmission power relational expression and out-of-band ASE power relational expression to obtain the 0 km-equivalent joint loss (i.e. how to solve the out-of-band ASE power according to the above formulas (I), (II), (III), (IV)) is completed by Matlab, specifically, the pump transmission power relational expression, the signal transmission power relational expression and the out-of-band ASE power relational expression are reformed into a format supported by a numerical solution of ordinary differential equation in Matlab;

The initial power and/or the termination power of each frequency light is established based on the pump transmission power relational expression, the signal transmission power relational expression and the out-of-band ASE power relational expression. That is, each boundary value is established, for a backward pump, the initial value of pump power is the value of terminal end of fiber (Z=L), i.e. the setting power of each pump laser; the initial value of signal light and ASE is the value of starting end of fiber (Z=0). During calculation, both of the attenuation coefficient and the optical power are all linear mW values; a numerical solution of a differential equation is calculated by the fourth-order Runge-Kutta algorithm or a boundary values method for solving differential equation in Matlab. In the specific calculation process, the number of pump light power variable and signal light power variable in the above formulas will usually be set according to the number of Raman pump lasers and signal light set in the specific environment, further, when calculating with Matlab, a set of initial values whose number is equal to the number of variables need to be substituted as the input parameter value of fourth-order Runge-Kutta algorithm, thus it further relies on the ordinary differential equation numerical solution of the above formulas, i.e. proposed initial signal optical power and initial Raman pump laser power.

Embodiment 4

Figure 19:
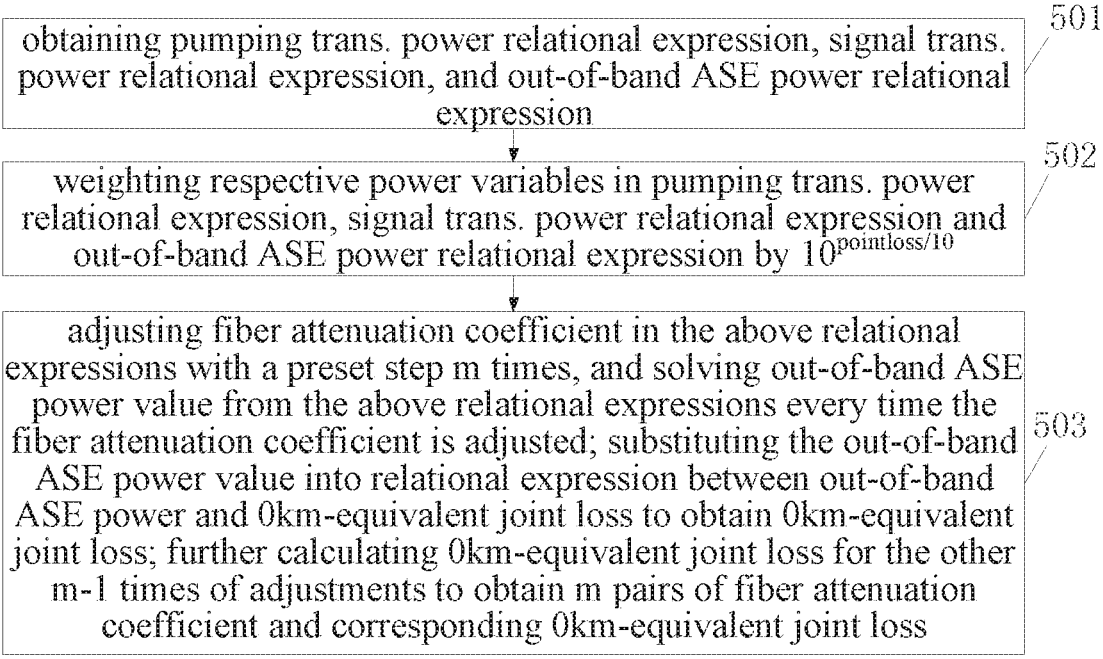
FIG. 19 is a flow chart of a method for determining a 0 km-equivalent joint loss of a fiber attenuation coefficient in a Raman fiber amplifier according to an embodiment of the present disclosure.

The embodiment of the present disclosure provides a method for determining a 0 km-equivalent joint loss of fiber attenuation coefficient in a Raman fiber amplifier. The determining method proposed in the embodiment of the present disclosure may be operated by a third-party computer, and the obtained data result may be imported into control unit 3 involved in each embodiment of the present disclosure, and the determining method described in the embodiment of the present disclosure may also be directly performed by the control unit 3, which is not particularly limited here. As described in FIG. 19, the method comprises:

In step 501, obtaining a pump transmission power relational expression, a signal transmission power relational expression, and an out-of-band ASE power relational expression.

In step 502, weighting each power variable in the pump transmission power relational expression, the signal transmission power relational expression and the out-of-band ASE power relational expression by a weighting value $$10^{\frac{pointloss}{10}},$$

respectively;

In step 503, adjusting a fiber attenuation coefficient in the pump transmission power relational expression, the signal transmission power relational expression and the out-of-band ASE power relational expression m times according to a preset step (e.g., increase or decrease 0.01 dB/km, 0.02 dB/km, 0.03 dB/km relative to the calibration fiber loss $\alpha_v$ for a total of m times, where m is a natural number), and solving out-of-band ASE power value from the pump transmission power relational expression, the signal transmission power relational expression and the out-of-band ASE power relational expression every time the fiber attenuation coefficient is adjusted; substituting the out-of-band ASE power value into a relational expression between the out-of-band ASE power and a 0 km-equivalent joint loss to obtain the 0 km-equivalent joint loss; and further calculating 0 km-equivalent joint loss for the other m−1 times of adjustments, thereby obtaining m pairs of fiber attenuation coefficient and corresponding 0 km-equivalent joint loss.

The relational expression between the out-of-band ASE power and the 0 km-equivalent joint loss is as follows: Pointloss=$(ASE_{out-of-band}-k*P_{pump}-b)/(k+1)$, where k is a tilt of the linear relationship, b is an intercept of the straight line. For description of reusing this formula, similar to the description in Embodiment 3, the difference is that what is equivalent to Pointloss at this time is a 0 km-equivalent joint loss caused by the fiber attenuation coefficient.

The embodiment of the present disclosure provides a method for calculating a 0 km-equivalent joint loss caused by different fiber attenuation coefficients. Based on the method provided by the embodiment of the disclosure, after setting sufficient joint loss positions and obtaining corresponding 0 km-equivalent joint loss under each set joint loss coefficient, a curve diagram as shown in FIG. 12 may be depicted. a table of a 0 km-equivalent joint loss varying with respect to the calibration fiber loss coefficient involved in each embodiment of the present disclosure may be calculated and established depending on the calculation method described in the embodiment of the present disclosure.

For obtaining the pump transmission power relational expression, the signal transmission power relational expression and the out-of-band ASE power relational expression involved in the embodiment of the present disclosure may refer to relevant description in Embodiment 4, and will not be described in detail here.

In the embodiment of the present disclosure, results of 0 km-equivalent joint loss caused by different fiber attenuation coefficients may be solved through steps 501-503; however, it may be found from the related description of Embodiment 1 and the above form of the pump transmission power relational expression, the signal transmission power relational expression and the out-of-band ASE power relational expression, that impact of fiber length and joint loss caused by distance between the joint and the pump source are simultaneously involved in each relational expression, therefore, in order to improve accuracy of calculation result of the embodiment of the present disclosure, preferably, the fiber joint loss in the pump transmission power relational expression, the signal transmission power relational expression and the out-of-band ASE power relational expression is set to 0; the fiber length is set to be larger than 100 km.

Wherein the fiber joint loss in the pump transmission power relational expression, the signal transmission power relational expression and the out-of-band ASE power relational expression setting as 0, is specifically represented that the above formulas (I), (II), (III), and (IV) are transformed again as follows when Pointloss is 0:

$$\frac{dP_0(z)}{dz} = \alpha_0 P_0(z) + \sum_{k=1}^{n} \frac{g_{0k}}{A_{eff}} P_0(z) P_k(z) \quad (\text{I}')$$

$$\frac{dP_i(z)}{dz} = \alpha_i P_i(z) - \sum_{j=0}^{i-1} \frac{g_{ji}}{A_{eff}} P_i(z) P_j(z) + \sum_{k=i+1}^{n} \frac{g_{ik}}{A_{eff}} P_i(z) P_k(z) \quad (\text{II}')$$

$$\frac{dP_0(z)}{dz} = \alpha_0 P_0(z) + \sum_{k=1}^{n} \frac{g_{0k}}{A_{eff}} P_0(z) P_k(z) \quad (\text{III}')$$

$$\frac{dP_{ASE}(z)}{dz} = -\alpha_{ASE} P_{ASE}(z) + \sum_{i=0}^{n} \frac{g_{i-ASE}}{A_{eff}} P_i(z) \left( P_{ASE}(z) + h\nu \left( 1 + \frac{1}{\exp\left(\frac{h\Delta\nu}{KT}\right) - 1} \right) \right) \quad (\text{IV}')$$

Then, the power value of the out-of-band ASE corresponding to respective fiber attenuation coefficient may be solved by formulas (I'), (II'), (III'), and (IV') with reference to the solving method similar to the solution of Matlab software in Embodiment 3, and substituted into Pointloss= $(ASE_{out-of-band}-k*P_{pump}-b)/(k+1)$, and the 0 km-equivalent joint loss is solved.

In the implementation process of the embodiment of the present disclosure, the reason why the weighting value $$10^{\frac{pointloss}{10}}$$

is introduced in the above step 502 is to explain the presentation form of the pump transmission power relational expression, the signal transmission power relational expression and the out-of-band ASE power relational expression when calculating the 0 km-equivalent joint loss from the level of principle; and it is known from the above transformed formulas (I'), (II'), (III'), and (IV') that after the joint loss impact factor caused by the distance between the joint and the pump source is strictly peeled off, the above weighting value $$10^{\frac{pointloss}{10}}$$

actually does not work, therefore, combined with the embodiment of the present disclosure, there is also a preferred implementation mode, i.e. omitting the weighting operation in step 502, that is to say, implementing the method described in the embodiment of the present disclosure through step 501 and step 503, at this time, it may not be necessary to perform the operation of setting the fiber joint loss in the pump transmission power relational expression, the signal transmission power relational expression and the out-of-band ASE power relational expression in the above preferred solution to 0.

Embodiment 5

Figure 20:
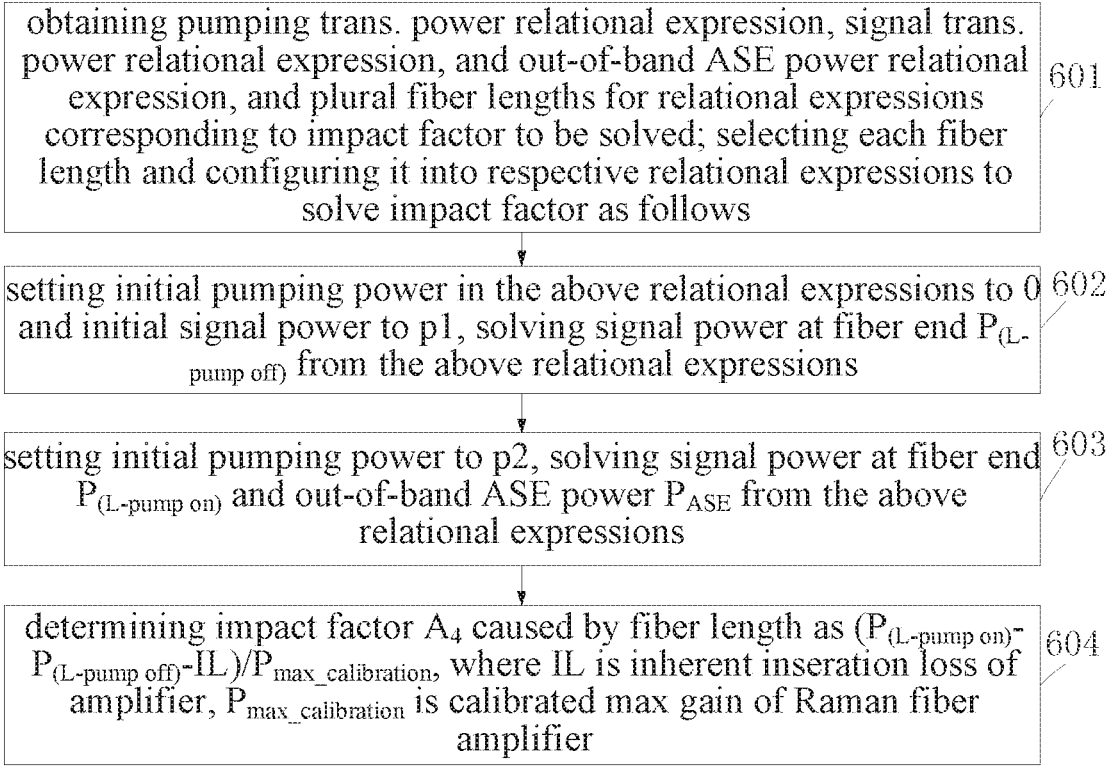
FIG. 20 is a flow chart of a method for determining the maximum gain impact factor corresponding to a fiber length in a Raman fiber amplifier according to an embodiment of the present disclosure.

The embodiment of the present disclosure provides a method for determining a maximum gain impact factor corresponding to a fiber length in a Raman fiber amplifier, which may be used to support the determination of the relationship between a fiber length and a gain impact factor involved in other related embodiments of the present disclosure. As shown in FIG. 20, the method comprises the following steps:

In step 601, obtaining a pump transmission power relational expression, a signal transmission power relational expression and an out-of-band ASE power relational expression, and a plurality of fiber lengths for relational expressions corresponding to the impact factor to be solved; selecting each fiber length and configuring it into the respective relational expression to solve the impact factor as follows:

In step 602, setting an initial pump value in the above relational expressions to 0 and an initial power of the signal light to P1, and obtaining the signal power $P_{(L\text{-}pump\ off)}$ at the fiber end according to the above relational expressions.

The power directly solved from the above relational expressions is a linear unit mW, and the signal power $P_{(L\text{-}pump\ off)}$ is obtained by conversion from mW to dBm, so as to subsequently perform formula on impact factors.

In that case of providing the initial pump value, the initial signal value and the initial ASE value, the initial power of forward ASE is 0.

In step 603, setting the initial value of the pump power to a preset value P2, and obtaining the signal power $P_{(L\text{-}pump\ on)}$ at the fiber end and the out-of-band ASE power $P_{ASE}$ from the above relational expressions.

The power directly solved according to the above relational expression is a linear unit mW, and the signal power $P_{(L\text{-}pump\ on)}$ at the fiber end and the out-of-band ASE power $P_{ASE}$ is obtained by a conversion from mW to dBm, so as to subsequently perform the formula calculation for solving impact factors.

In step 604, the impact factor A4 caused by the fiber length being $(P_{(L\text{-}pump\ on)} - P_{(L\text{-}pump\ off)} - IL)/P_{max\_calibration}$ where the inherent insertion loss of the amplifier is IL, $P_{max\_calibration}$ is the calibrated maximum gain of the Raman fiber amplifier, and $P_{(L\text{-}pump\ on)}$, $P_{(L\text{-}pump\ off)}$ and $P_{max\_calibration}$ are in dBm.

The embodiment of the present disclosure provides an implementation method for calculating a maximum gain impact factor under different fiber lengths. Depending on the method provided by the embodiment of the disclosure, a curve diagram as shown in FIG. 7 may be depicted after setting sufficient fiber lengths and calculating each impact factor. Based on the calculation method described in the embodiment of the present disclosure, a corresponding relationship of each impact factor with respect to the fiber length involved in each embodiment of the present disclosure may be calculated and established.

In the implementation process of the embodiment of the present disclosure, in order to avoid the impact of fiber attenuation coefficient (i.e. the 0 km-equivalent joint loss of fiber attenuation coefficient) on the relationship between the fiber length and the impact factor—the subject concerned in the embodiment of the present disclosure, preferably, the fiber attenuation coefficient in the pump transmission power relational expression, the signal transmission power relational expression and the out-of-band ASE power relational expression is set to a calibration value. For example: $\alpha_0$ is set to 0.25 dB/km, $\alpha_i$ is set to 0.25 dB/km, $\alpha_n$ is set to 0.2 dB/km, and $\alpha_{ase}$ is set to 0.2 dB/km. It should be emphasized that the weighting value $$10^{\frac{pointloss}{10}}$$

is not introduced into each relational expression in the embodiment of the present disclosure, therefore, there is no impact of the 0 km-equivalent joint loss caused by the distance between the joint and the pump source on the calculation process.

The embodiment of the present disclosure also provides an effective means for solving a signal power and an out-of-band ASE power from the pump transmission power relational expression, the signal transmission power relational expression and the out-of-band ASE power relational expression, specifically:

reforming the pump transmission power relational expression, the signal transmission power relational expression and the out-of-band ASE power relational expression into a format supported by a numerical method of ordinary differential equation in Matlab;

calculating a numerical solution of the differential equation by the fourth-order Runge-Kutta algorithm or a boundary value method in Matlab.

Further, the embodiment of the present disclosure also provides the above pump transmission power relational expression, signal transmission power relational expression and out-of-band ASE power relationship.

For example, the pump transmission power relational expression further comprises:

a first pump light transmission power relational expression:

$$\frac{dP_0(z)}{dz} = \alpha_0 P_0(z) + \sum_{k=1}^{n} \frac{g_{0k}}{A_{eff}} P_0(z) P_k(z),$$

where $\alpha_0$ is a transmission loss of a wavelength corresponding to the pump $$P_0, \frac{g_{0k}}{A_{eff}}$$

is a Raman gain coefficient from the pump $P_0$ to the pump or signal $P_k$.

a second pump light transmission power relational expression:

$$\frac{dP_i(z)}{dz} = \alpha_i P_i(z) - \sum_{j=0}^{i-1} \frac{g_{ji}}{A_{eff}} P_i(z) P_j(z) + \sum_{k=i+1}^{n} \frac{g_{ik}}{A_{eff}} P_i(z) P_k(z),$$

where $\alpha_i$ is a transmission loss of a wavelength corresponding to the pump $$P_i, \frac{g_{ji}}{A_{eff}}$$

is a gain coefficient between the pump $P_i$ and the pump $$P_j, \frac{g_{ik}}{A_{eff}}$$

is a gain coefficient between the pump $P_i$ and the pump or signal $P_k$.

For example, the signal transmission power relational expression further comprises:

$$\frac{dP_n(z)}{dz} = -\alpha_n P_n(z) + \sum_{j=0}^{n-1} \frac{g_{jn}}{A_{eff}} P_n(z) P_j(z),$$

where $\alpha_n$ is an attenuation coefficient of the n-th signal wavelength $\frac{g_{in}}{A_{\textit{eff}}}$ is a gain coefficient between the j-th pump and the n-th signal, $P_n$ is power of the n-th signal, $P_j(z)$ is power of the j-th signal or pump with a wavelength less than the n-th signal wavelength.

For example, the out-of-band ASE power relational expression further comprises:

$$\frac{dP_{ASE}(z)}{dz} = -\alpha_{ASE}P_{ASE}(z) + \sum_{i=0}^{n} \frac{g_{i-ASE}}{A_{\textit{eff}}} P_i(z)\left(P_{ASE}(z) + hv\left(1 + \frac{1}{\exp\left(\frac{h\Delta v}{KT}\right) - 1}\right)\right),$$

where $P_{ASE}(z)$ is the out-of-band ASE power of the frequency v varying with the distance z, $\alpha_{ASE}$ is an attenuation coefficient of the out-of-band ASE at a certain frequency, $\frac{g_{i-ASE}}{A_{\textit{eff}}}$ is a gain coefficient from the i-th pump to the out-of-band ASE of the frequency v, h is the Planck's constant, v is the frequency of the out-of-band ASE, K is the Boltzmann constant, T is the ambient temperature, $\Delta v$ is a frequency shift from the pump light frequency to the out-of-band ASE, $P_i(z)$ is the power value of the i-th pump.

In the embodiment of the present disclosure, a determining method is also provided for the calibrated maximum gain $G_{max\_calibration}$ involved in step 604, and further comprises:

establishing a relational expression between a gain tilt and a maximum gain through collecting maximum gain values of a Raman fiber amplifier under respective gain tilt in advance;

and looking up the above established relational expression between the gain tilt and the maximum gain by a gain tilt of a current fiber transmission line to obtain a calibrated maximum gain $G_{max\_calibration}$.

wherein the establishing a relational expression between a gain tilt and a maximum gain comprises:

when Tilt<$Tilt_{turning\ point}$, $G_{max\_calibration}=k_{01}*Tilt+b_{01}$;

when Tilt≥$Tilt_{turning\ point}$, $G_{max\_calibration}=k_{02}*Tilt+b_{02}$;

and looking up the above established relational expression between the gain tilt and the maximum gain by a gain tilt of a current fiber transmission line to obtain a calibrated maximum gain $G_{max\_calibration}$, further comprises:

substituting a Tilt setting value into corresponding one of the above two formulas to obtain the calibrated maximum gain $G_{max\_calibration}$.

Embodiment 6

The embodiment of the present disclosure will describe how to implement the method proposed in Embodiment 1 and Embodiment 2 of the present disclosure in specific application scenario combined with the related module units in FIG. 1 or FIG. 2. The main operating principle of the present disclosure is that in the initialization process of electrification, the control unit 3 drives a light source (i.e. a certain pump laser in the pump laser group 1 or an additional OTDR light source 14) of OTDR to operate by controlling different modulation signals 4, OTDR detects joint loss, fiber lengths and fiber loss coefficients at different positions of fiber, and the detected parameter information is stored in the control unit 3, and then entering a normal pump mode of the Raman pump module, the control unit 3 firstly controls pump output power of pump laser groups 1, 2 to a relatively low level (e.g., meeting requirements of CLASS 1M), and obtains a total joint loss AttToal through the out-of-band ASE power detection, and this total joint loss $Att_{Toal}$ is then calculated with other two equivalent joint loss ($Att_{point}$ and $Att_{coefficient}$) detected by OTDR, and the maximum gain which can be achieved by this Raman fiber amplifier in the current environment may be calculated in combination with a length of transmission fiber, finally, according to the comparison between the maximum gain and the setting gain, the control for the final target gain and the gain tilt of this amplifier are realized. In the embodiment of the present disclosure, 0 km above described in each embodiment represents that an out-of-band ASE detection apparatus and the Raman pump laser are set at the same position, and the distance between the two is approximately 0 km.

Figure 21A:
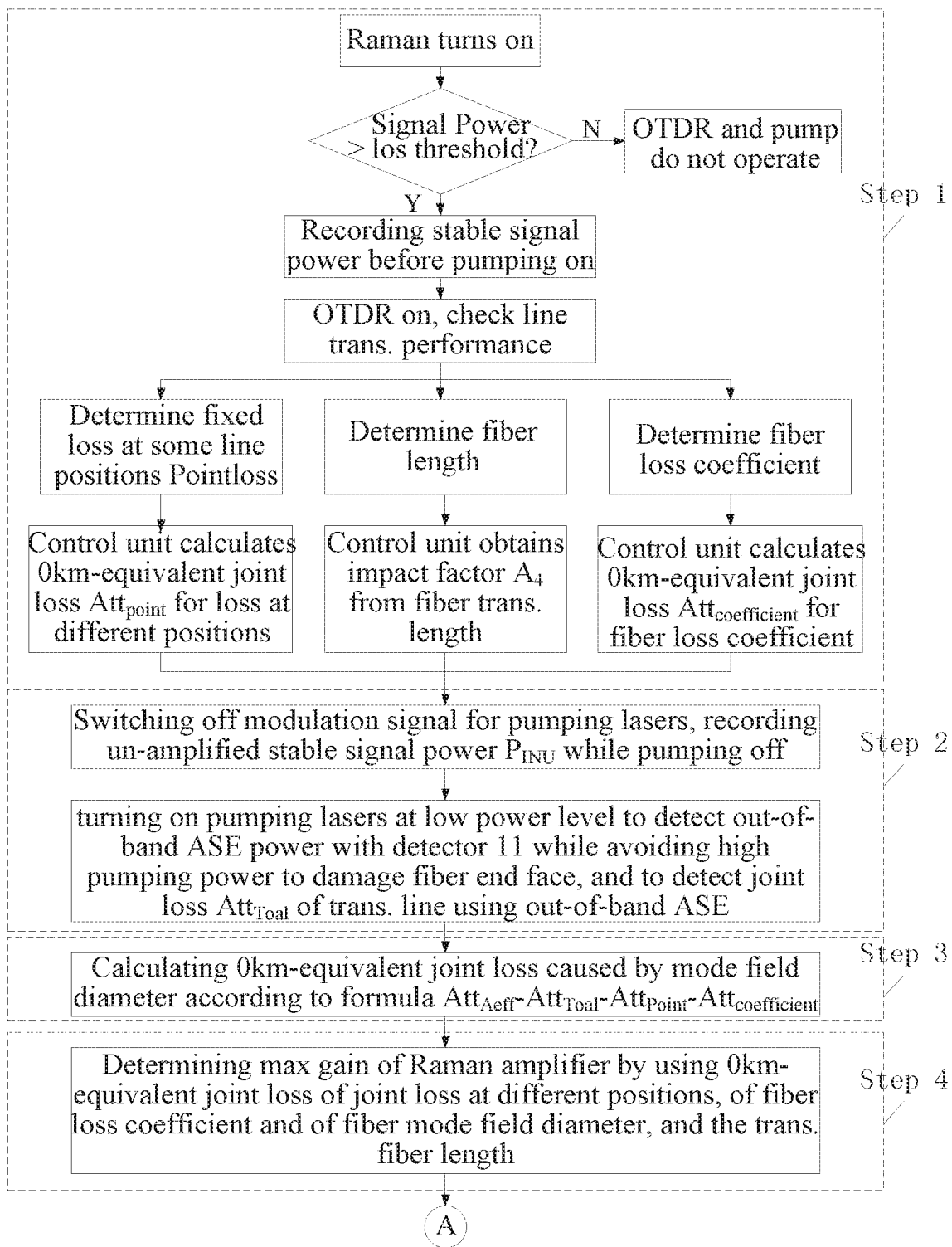
FIGS. 21A and 21B together form FIG. 21, which is a flow chart of a method for controlling an automatic gain of a Raman fiber amplifier according to an embodiment of the present disclosure.
Figure 21B:
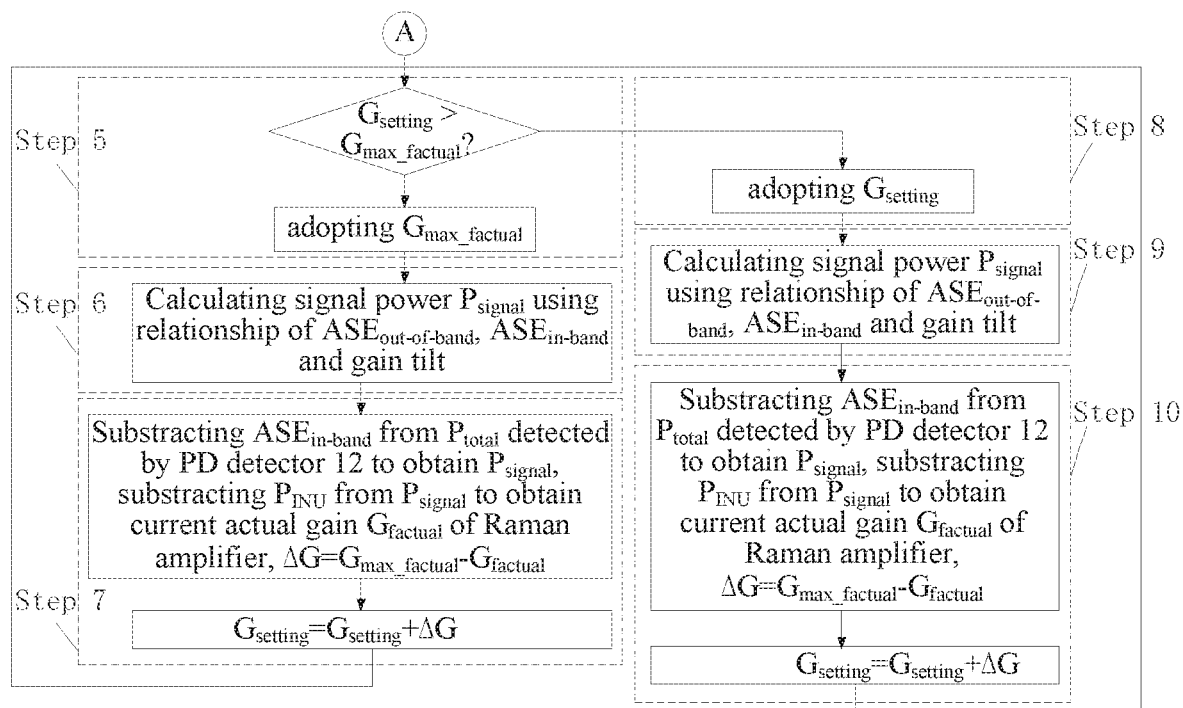

Specifically, as shown in FIG. 21, the present disclosure is implemented by the following steps:

Step 1: electrifying a Raman pump module, during the electrification of the Raman pump module, a certain pump laser in the pump laser group 1 or the pump laser group 2 being operating as an OTDR light source, or driving an additional laser 14 to operate, modulated signals 4 generated by control unit 3 having different pulse widths, control unit 3, modulated signals 4, optical circulator 5 and photodetector 6 constituting OTDR. Checking whether signal power is larger than a LOS threshold, when it is larger than the LOS threshold, recording stable signal power $P_{INU}$ without opening the Raman pump laser. OTDR being turned on to check the transmission performance of a fiber line, and OTDR firstly testing three parameters of a fiber transmission loss, a joint loss and a transmission fiber length of a transmission fiber, and data being stored in control unit 3 after the test is completed. Control unit 3 equivalizing a joint loss Pointloss at different positions of fiber to a 0 km-equivalent joint loss Pointloss, recording as $Att_{point}$, specifically, establishing, in control unit 3, a table of a 0 km-equivalent joint loss varying a position in the fiber, and obtaining the 0 km-equivalent joint loss for a positions in the fiber by looking up the table and interpolation, as shown in FIG. 11; determining fiber loss coefficient meaning equivalizing a fiber loss coefficient to a 0 km-equivalent joint loss Pointloss and recording as $Att_{coefficient}$, specifically, establishing in control unit 3 a table of a 0 km-equivalent joint loss varying with respect to the calibration fiber loss coefficient, and obtaining the 0 km-equivalent joint loss by looking up the table and interpolation or fitting a formula, as shown in FIG. 12. After determining the fiber length by OTDR, feeding the fiber length back to control unit 3, and determining, by control unit 3, a correction amount ΔASE of a target ASE, wherein when the fiber length is ≥100 km, ΔASE=0; when the fiber length is less than 100 km, ΔASE may be obtained by look-up table or interpolation or function fitting.

Step 2: turning off the pump laser tested as OTDR in step 1, and recording the stable unamplified signal power $P_{INU}$ without opening the Raman pump laser, turning on the pump laser to a low power level condition to enable detector 11 to detect out-of-band ASE optical power and prevent a fiber end face from being damaged by excessive pump power, at the same time, obtaining a total joint loss Pointloss of the transmission line by using the out-of-band ASE, the total joint loss Pointloss being recorded as $Att_{Toal}$; the above low pump power condition referring to the used pump power being not large, for example, tens of mW, or about 100 mW, and the reason for selecting low pump power being mainly safety consideration, i.e. when the pump power is too large, it is easy to burn the end face of fiber or cause other dangerous situation. firstly setting pump to a low power condition during opening process, under this pump power, generating out-of-band ASE power and recording it as $P_{ASE\text{-}real}$ and its unit being dBm, recording the low pump power used to calculate joint loss as $P_{pump}$ and its unit being dBm, and the total joint loss being recorded as $Att_{Toal}$, then:

$$Att_{Toal} = (P_{ASE\text{-}real} - b - k*P_{pump})/(k+1),$$

where $P_{pump}$ is power of a pump laser, k is a tilt of the linear relationship, b is an intercept of the straight line.

Step 3: control unit 3 calculating a joint loss Pointloss caused by mode field diameter or effective area factor and recording as $Att_{Aeff}$ by control unit 3; and $$Att_{Aeff} = Att_{Toal} - Att_{point} - Att_{coefficient} \quad (1)$$

Step 4: determining an actual maximum gain that may be achieved by the Raman pump module by combining with the 0 km joint loss $Att_{point}$ equivalent to a joint loss at different positions, the 0 km-equivalent joint loss value $Att_{coefficient}$ of fiber loss system, the 0 km-equivalent joint loss value $Att_{Aeff}$ of the fiber mode field and the transmission fiber length. That is, determining the maximum gain $G_{max\_factual}$ that may be achieved by the Raman fiber amplifier according to the actual condition of different application environments.

Specifically, different types of joint loss, such as an equivalent joint loss $Att_{point}$ introduced by nodes at different positions of fiber, an equivalent joint loss $Att_{coefficient}$ introduced by the fiber loss coefficient, and an equivalent joint loss $Att_{aeff}$ introduced by the fiber effective area, have different impact factors on the maximum gain, and establishing in control unit 3 a table of reduced ratio data or functional relationship between an equivalent joint loss $Att_{point}$ equivalent to a joint loss at different positions of the fiber, an equivalent joint loss $Att_{coefficient}$ introduced by the fiber loss coefficient, and an equivalent joint loss $Att_{aeff}$ introduced by the effective fiber area and the maximum gain that can actually be achieved is implemented by looking up table or interpolation or function fitting during the control process. Wherein the 0 km-equivalent joint loss $Att_{point}$ of the fiber joint loss and the 0 km-equivalent joint loss $Att_{coefficientt}$ of the fiber loss coefficient may be larger than 0, or may be less than 0 or equal to 0, while the 0 km-equivalent joint loss $Att_{Aeff}$ of mode field diameter is negative, therefore, the impact of ratio of the actual maximum Raman gain to the calibrated maximum Raman gain at different equivalent joint loss is shown in FIG. 6 and FIG. 8. The fiber length also has an effect on the maximum Raman gain that can actually be achieved, when the fiber length exceeds 100 km, the influence on the maximum Raman gain will be very small, and the ratio of the maximum gain at different fiber lengths to the maximum Raman gain at 100 km is shown in FIG. 7.

FIG. 6, FIG. 7 and FIG. 8 show the impact of different types of joint loss on the maximum gain, i.e. the relationship between different types of joint loss and the maximum gain may be expressed in the form of a diagram, since this diagram reflects data corresponding relationship, these one-to-one corresponding data may also establish a lookup table, and if a certain number needed in control process is not in this table, the corresponding data may be calculated through an interpolation algorithm; in actual control process, this diagram may also be fitted with function to obtain a corresponding relationship described by an analytical expression.

Before calculating the actual maximum gain $G_{max\_factual}$ that may be actually achieved, it is usually necessary to determine the calibrated maximum gain $G_{max\_calibration}$ of a current fiber transmission line according to a ratio relationship between the gain tilt Tilt and the calibrated maximum gain; and to determine the actual maximum gain $G_{max\_factual}$ that may be actually achieved by the Raman fiber amplifier, according to the calibrated maximum gain $G_{max\_calibration}$, and the impact of the distance between the joint and the pump source, the fiber loss coefficient, the fiber mode field diameter and the fiber length on the calibrated maximum gain $G_{max\_calibration}$.

In a case where there is no influence of different types of joint loss (including a fiber loss coefficient, a distance between a joint and a pump source and a fiber mode field diameter) and a fiber length, the maximum gain of a Raman fiber amplifier under different gain tilts is shown in FIG. 15, and a turning point of the maximum gain corresponds to two groups of different pump lasers and simultaneously achieves the maximum power, therefore, the gain tilt corresponding to this turning point relates to a specific Raman fiber amplifier and needs to be determined by calibration.

Therefore, $G_{max\_calibration}$ corresponds to two different groups of straight lines before and after the turning point, when Tilt<$Tilt_{turning\ point}$, $$G_{max} = k_{01}*Tilt + b_{01}; \quad (2)$$

When Tilt≥$Tilt_{turning\ point}$, $$G_{max} = k_{02}*Tilt + b_{02}; \quad (3)$$

where Tilt represents a gain tilt; $k_{01}$ and $k_{02}$ respectively represent tilts to be calibrated, and $b_{01}$ and $b_{02}$ respectively represent intercepts to be calibrated.

Considering impact of different types of equivalent joint loss and fiber lengths on the maximum gain, assuming that impact factors of the joint loss $Att_{point}$, the equivalent joint loss $Att_{coefficient}$ of fiber loss coefficient, the equivalent joint loss $Att_{Aeff}$ of effective fiber area and a fiber length x on the maximum gain are respectively $A_1$, $A_2$, $A_3$, $A_4$, the overall impact on the maximum gain is:

$$A = A_1*A_2*A_3*A_4 \quad (4)$$

and the maximum gain that may actually be achieved is:

$$G_{max\_factual} = G_{max\_calibration}*A \quad (5)$$

where $G_{max\_calibration}$ is the calibrated maximum of the Raman fiber amplifier, $G_{max\_factual}$ is the maximum gain that may actually be achieved under various impact of loss and attenuation in actual application environment.

Step 5: If the setting gain $G_{setting}$ is larger than the actual maximum $G_{max\_factual}$ that may actually be achieved, substituting the maximum gain $G_{max\_factual}$ (that may be actually achieved) into formula (6) and formula (7), and performing the actual maximum gain $G_{max\_factual}$ that may be actually achieved. Wherein calculating $G_{max\_factual}$ as a specific value of parameter G in Formula (6) and Formula (7). Otherwise, proceeding to step 9.

Specifically, the linear relationship among the out-of-band ASE, the gain and the gain tilt:

$$ASE_{out\text{-}of\text{-}band} + \Delta ASE = k_1*G + k_2*Tilt + b_1 + Att_{point} \quad (6)$$

where $ASE_{out-of-band}$ is optical power of the out-of-band ASE, i.e. $P_{out-of-band\_ASE}$, $k_1$ is a tilt factor of the linear relationship between the out-of-band ASE optical power (its unit is dBm) and the amplifier gain G (its unit is dB), $k_2$ is a tilt factor of the linear relationship between the out-of-band ASE optical power (its unit is dBm) and the gain tilt Tilt (its unit is dB), b1 is an intercept; the $k_1$, $k_2$ and $b_1$ are all obtained by calibration, and $\Delta ASE$ is a correction term.

The Output power ratio relationship of Raman pump laser group:

$$p_1/p_2 = k_3 * G + k_4 * Tilt + b_2 \qquad (7)$$

$p_1$ is the output power of Raman pump laser group 1, $p_2$ is the output power of Raman pump laser group 2, $k_3$ is a tilt factor linearly related to the amplifier gain G (its unit is dB), and $k_4$ is a tilt factor linearly related to the gain tilt Tilt (its unit is dB), $b_2$ is an intercept, and $k_3$, $k_4$ and $b_2$ are all obtained by calibration.

G in the above formula (6) and formula (7) is the target gain, i.e. the setting gain $G_{setting}$ that may actually be achieved.

Step 6: calculating signal power $P_{signal}$ by using the linear relationship among the out-of-band $ASE_{out-of-band}$, the in-band $ASE_{in-band}$ and the gain tilt. Specifically, the in-band $ASE_{in-band}$ power is calculated by the following formula (8).

$$ASE_{in-band} = k_5 * ASE_{out-of-band} + k_6 Tilt + (k_5-1)* Att_{point} + b \qquad (8)$$

where $ASE_{in-band}$ is the ASE optical power within an operating bandwidth and its unit is dBm, $ASE_{out-of-band}$ is the ASE optical power outside the operating bandwidth and its unit is dBm, and $k_5$ is a ratio coefficient of the linear relationship between the out-of-band $ASE_{out-of-band}$ and the in-band $ASE_{in-band}$, $k_6$ is an impact factor on a relationship between the original in-band $ASE_{in-band}$ and the out-band $ASE_{out-of-band}$ under different gain tilts, and b is an intercept.

Step 7: Detecting total power $P_{total}$ by PD detector 12, where the total power $P_{total}$ detected by PD detector 12 includes two portions, one portion is the signal power $P_{signal}$, the other portion is the in-band $ASE_{in-band}$ power whose unit is in mW, and obtaining the signal power $P_{signal}$, its unit is in dBm, by subtracting the calculated $ASE_{in-band}$ from the total power $P_{total}$. The specific calculation formula is as follows:

$$P_{signal} = 10 * \log_{10}(P_{total} - 10^{\wedge}(ASE_{in-band}/10)) \qquad (9)$$

obtaining a current actual gain $G_{factual}$ of the Raman fiber amplifier by subtracting the stable signal power $P_{INU}$ before the Raman pump laser is turned on from the obtained signal power $P_{signal}$.

$$G_{factual} = P_{signal} - P_{INU} \qquad (10)$$

Adjusting control parameter of the Raman pump module by Control unit 3 to raise its gain to $G_{factual}$ so as to complete gain control of the Raman fiber amplifier.

Recording the gain value G obtained by formula (6) and formula (7) as $G_{operation}$, and calculating a gain error by control unit 3.

$$\Delta G = G_{operation} - G_{factual} \qquad (11)$$

If $\Delta G$ exceeds the gain control accuracy requirement, substituting $\Delta G + G_{factual}$ into formula (6) and formula (7) in step 5 as a new gain G control quantity to perform iterative calculation and implement feedback control, thereby achieving control accuracy requirement.

Step 8: if the setting gain $G_{setting}$ is less than the maximum gain $G_{max\_factual}$ (that may be actually achieved), substituting the setting gain $G_{setting}$ into formula (6) and formula (7) and obtaining the following two formulas:

$$ASE_{out-of-band} + \Delta ASE = k_1 * G_{setting} + k_2 * Tilt + b_1 + Att_{point}$$

$$p_1/p_2 = k_3 * G_{setting} + k_4 * Tilt + b_2$$

Step 9: calculating the signal power $P_{signal}$ with the linear relationship among the out-of-band $ASE_{out-of-band}$, the in-band $ASE_{in-band}$ and the gain tilt. Specifically, the in-band $ASE_{in-band}$ power is calculated by the formula (8).

Step 10: detecting the total power $P_{total}$ by PD detector 12, obtaining the signal power $P_{signal}$, its unit is in dBm, by subtracting the calculated $ASE_{in-band}$ from the total power $P_{total}$ (The specific calculation formula is shown as formula (9)), and calculating the current actual gain $G_{factual}$ of the Raman fiber amplifier (The specific calculation formula is shown as formula (10)), where the total power $P_{total}$ detected by PD detector 12 includes two portions, one portion is the signal power $P_{signal}$, the other portion is the in-band $ASE_{in-band}$ power whose unit is in mW.

Adjusting control parameters of the Raman pump module by control unit 3 to raise its gain to $G_{factual}$ so as to complete gain control of the Raman fiber amplifier.

Recording the gain value G obtained by formula (6) and formula (7) as $G_{operation}$, and calculating a gain error by control unit 3.

$$\Delta G = G_{operation} - G_{factual} \qquad (11)$$

If $\Delta G$ exceeds the gain control accuracy requirement, substituting $\Delta G + G_{factual}$ as a new gain G control quantity into formula (6) and formula (7) in step 5 to perform iterative calculation and implement feedback control, thereby achieving the control accuracy requirement.

It should be noted that the contents such as information interaction and execution process and the like between the modules and units of the above apparatus and the system are based on the same concept as the processing method of the embodiments of the present disclosure, and the specific contents may be referred to the description in the method embodiment of the present disclosure and will not be repeated here.

Those skilled in the art may understand that all or part of the various methods of the embodiments of the present disclosure may be completed by a program to instruct related hardware, and the program may be stored in a computer readable storage medium, and the storage medium may include read only memory (ROM, Read Only Memory), random access memory (RAM, Random Access Memory), disk or optical disk and so on.

What is described above is only a preferred embodiment of the present disclosure, and is not intended to limit the present disclosure, and any modifications, equivalent substitutions and improvements made within the spirit and principles of the present disclosure should be included within the scope of protection of the present disclosure.

What is claimed is:

1. A method for determining a maximum gain of a Raman fiber amplifier, characterized in that a relationship between the maximum Raman gain and a 0 km joint loss $Att_{point[i]}$ equivalent to a joint loss at different positions of one or more types of fibers, a relationship between the maximum Raman gain and a 0 km joint loss $Att_{coefficient[j]}$ equivalent to a joint loss caused by a loss coefficient of the fibers, a relationship between the maximum Raman gain and a 0 km joint loss AttAeffuq equivalent to a joint loss caused by a mode field diameter of the fibers, and a relationship between the maximum Raman gain and a fiber length are pre-configured, where i is a distance from a joint to a pump source, j is the loss coefficient of the fibers, and k is the mode field diameter of the fibers, the method comprises:

obtaining, by an optical time domain reflectometer (OTDR) including a control unit, a modulated signal from the control unit, an optical circulator and a photodetector, transmission performance parameters of a current optical fiber transmission line, the transmission performance parameters including a distance between the joint and the pump source, a fiber loss coefficient, and a fiber length;

looking up the relationship between the maximum Raman gain and the joint loss $Att_{point[i]}$, the relationship between the maximum Raman gain and the joint loss $Att_{coefficient[j]}$, and the relationship between the maximum Raman gain and the fiber length according to the distance between the joint and the pump source, the fiber loss coefficient, and the fiber length included in the transmission performance parameters to obtain a maximum gain impact factor $A_1$, a maximum gain impact factor $A_2$, and a maximum gain impact factor $A_4$, respectively;

calculating a 0 km joint loss $Att_{Aeff}$ equivalent to a joint loss caused by the mode field diameter of the fiber in the current fiber transmission line according to the distance between the joint and the pump source and the fiber loss coefficient, and looking up the relationship between the maximum Raman gain and the joint loss $Att_{point[k]}$ according to the joint loss $Att_{Aeff}$ to obtain a maximum gain impact factor $A_3$;

determining the maximum gain $G_{max\_factual}$ which the Raman fiber amplifier can actually achieve according to the impact factors $A_1$, $A_2$, $A_3$, and $A_4$.

2. The method for determining a maximum gain of a Raman fiber amplifier of claim 1, characterized in that calculating a 0 km joint loss $Att_{Aeff}$ equivalent to a joint loss caused by the mode field diameter of the fiber in the current fiber transmission line according to the distance between the joint and the pump source and the fiber loss coefficient, and looking up the relationship between the maximum Raman gain and the joint loss $Att_{point[k]}$ according to the joint loss $Att_{Aeff}$ to obtain a maximum gain impact factor $A_3$, further comprises:

obtaining a 0 km-equivalent joint loss $Att_{point}$ according to the distance between the joint and the pump source, and obtaining a 0 km-equivalent joint loss $Att_{coefficient}$ according to the fiber loss coefficient;

obtaining a total joint loss Pointloss of the transmission line by using out-of-band ASE, the total joint loss Pointloss being also recorded as $Att_{Total}$;

calculating a 0 km-equivalent joint loss $Att_{Aeff}$ caused by the mode field diameter in the current fiber transmission line according to $Att_{Aeff}=Att_{Total}-Att_{point}-Att_{coefficient}$; and looking up the relationship between the maximum Raman gain and the joint loss $Att_{Aeff[k]}$ according to the joint loss $Att_{Aeff}$ to obtain the maximum gain impact factor $A_3$.

3. The method for determining a maximum gain of a Raman fiber amplifier of claim 2, characterized in that obtaining a total joint loss Pointloss of the transmission line by using out-of-band ASE, further comprises:

obtaining an out-of-band ASE power $ASE_{out-of-band}$, and calculating the total joint loss Pointloss according to a formula $Att_{total}=(ASE_{out-of-band}-k*P_{pump}-b)/(k+1)$, where $ASE_{out-of-band}$ is detected out-of-band ASE power, $P_{pump}$ is pump power for calculating the joint loss, $Att_{Total}$ is the total joint loss, k is a tilt of the linear relationship, and b is an intercept of the straight line.

4. The method for determining a maximum gain of a Raman fiber amplifier of claim 1, characterized in that the relationship between the maximum Raman gain and the joint loss $Att_{point[i]}$, the relationship between the maximum Raman gain and the joint loss $Att_{coefficient[j]}$, and the relationship between the maximum Raman gain and the joint loss $Att_{Aeff[l]}$ further comprises:

calculating an actual maximum gain value according to each loss value $Att_{point[i]}$, and dividing the actual maximum gain value by a calibrated maximum gain value to obtain a corresponding impact factor; establishing a relationship between each loss value $Att_{point[i]}$ and the corresponding impact factor;

calculating an actual maximum gain value according to each loss value $Att_{coefficient[j]}$, and dividing the actual maximum gain value by the calibrated maximum gain value to obtain a corresponding impact factor; establishing a relationship between each loss value $Att_{coefficient[j]}$ and the corresponding impact factor; and calculating an actual maximum gain value according to each loss value $Att_{Aeff[l]}$, and dividing the actual maximum gain value by the calibrated maximum gain value to obtain a corresponding impact factor; establishing a relationship between each loss value $Att_{Aeff[l]}$ and the corresponding impact factor.

5. The method for determining a maximum gain of a Raman fiber amplifier of claim 1, characterized in that determining the maximum gain $G_{max\_factual}$ which the Raman fiber amplifier can actually achieve according to the impact factors $A_1$, $A_2$, $A_3$, and $A_4$, further comprises:

calculating an equivalent impact factor A by a formula $A=A_1*A_2*A_3*A_4$ according to the impact factors $A_1$, $A_2$, $A_3$ and $A_4$;

calculating the actual maximum gain value $G_{max\_factual}$ by a formula $G_{max\_factual}=G_{max\_calibration}*A$, where $G_{max\_calibration}$ is a calibrated maximum gain of the Raman fiber amplifier.

6. The method for obtaining a method for controlling automatic gain of Raman fiber amplifier of claim 5, characterized in that when the Raman fiber amplifier is a distributed Raman fiber amplifier, the calibrated maximum gain $G_{max\_calibration}$ is obtained by the following steps:

establishing a relational expression between a gain tilt and the maximum gain through collecting maximum gain values of the Raman fiber amplifier under various gain tilts in advance;

looking up the relational expression between a gain tilt and the maximum gain according to the gain tilt of the current fiber transmission line to obtain the calibrated maximum gain $G_{max\_calibration}$.

7. The method for controlling automatic gain of Raman fiber of claim 6, characterized in that establishing a relational expression between a gain tilt and the maximum gain comprises:

when $Tilt<Tilt_{turning\ point}$, $$G_{max\_calibration}=k_{01}*Tilt+b_{01};$$

when $Tilt \geq Tilt_{turning\ point}$, $$G_{max\_calibration}=k_{02}*Tilt+b_{02};$$

looking up the relational expression between a gain tilt and the maximum gain according to the gain tilt of the current fiber transmission line to obtain the calibrated maximum gain $G_{max\_calibration}$, further comprises;

calculating the calibrated maximum gain $G_{max\_calibration}$ by substituting a Tilt setting value into a corresponding formula of the above two formulas.

8. The method for determining a maximum gain of a Raman fiber amplifier of claim 1, characterized in that the 0 km joint loss $Att_{point[i]}$ equivalent to a joint loss at different positions of one or more types of fibers, further comprises:
the value $Att_{point}$ is obtained by establishing in a control unit a table of 0 km-equivalent joint loss varying with a position in the fiber and then obtaining a 0 km-equivalent joint loss value for a position in the fiber by looking up the table and interpolation.

9. The method for determining a maximum gain of a Raman fiber amplifier of claim 1, characterized in that the 0 km joint loss $Att_{coefficient[j]}$ equivalent to a joint loss caused by a loss coefficient of the fibers, further comprises:
the value $Att_{coefficient}$ is obtained by establishing in a control unit a table of 0 km-equivalent joint loss varying with a calibrated loss coefficient of the fibers and then obtaining a 0 km-equivalent joint loss value for a fiber loss coefficient by looking up the table and interpolation.

10. An apparatus for determining a maximum gain of a Raman fiber amplifier, characterized in comprising:
at least one processor; and
a memory in communication with the at least one processor, the memory having instructions stored therein, and the instructions, when executed by the at least one processor, causing the at least one processor to perform following steps:
obtaining, by an OTDR including a control unit, a modulated signal from the control unit, an optical circulator and a photodetector, transmission performance parameters of a current optical fiber transmission line, the transmission performance parameters including a distance between the joint and the pump source, a fiber loss coefficient, and a fiber length;
looking up the relationship between the maximum Raman gain and the joint loss $Att_{point[i]}$, the relationship between the maximum Raman gain and the joint loss $Att_{coefficient[j]}$, and the relationship between the maximum Raman gain and the fiber length according to the distance between the joint and the pump source, the fiber loss coefficient, and the fiber length included in the transmission performance parameters to obtain a maximum gain impact factor $A_1$, a maximum gain impact factor $A_2$, and a maximum gain impact factor $A_4$, respectively;
calculating a 0 km joint loss $Att_{Aeff}$ equivalent to a joint loss caused by the mode field diameter of the fiber in the current fiber transmission line according to the distance between the joint and the pump source and the fiber loss coefficient, and looking up the relationship between the maximum Raman gain and the joint loss $Att_{point[k]}$ according to the joint loss $Att_{Aeff}$ to obtain a maximum gain impact factor $A_3$; and
determining the maximum gain $G_{max\_factual}$ which the Raman fiber amplifier can actually achieve according to the impact factors $A_1$, $A_2$, $A_3$, and $A_4$,
wherein a relationship between the maximum Raman gain and a 0 km joint loss $Att_{point[i]}$ equivalent to a joint loss at different positions of one or more types of fibers, a relationship between the maximum Raman gain and a 0 km joint loss $Att_{coefficient[j]}$ equivalent to a joint loss caused by a loss coefficient of the fibers, a relationship between the maximum Raman gain and a 0 km joint loss $Att_{Aeff[k]}$ equivalent to a joint loss caused by a mode field diameter of the fibers, and a relationship between the maximum Raman gain and a fiber length are pre-determined, where i is a distance from a joint to a pump source, j is the loss coefficient of the fibers, and k is the mode field diameter of the fibers.

11. The apparatus of claim 10, characterized in that calculating a 0 km joint loss $Att_{Aeff}$ equivalent to a joint loss caused by the mode field diameter of the fiber in the current fiber transmission line according to the distance between the joint and the pump source and the fiber loss coefficient, and looking up the relationship between the maximum Raman gain and the joint loss $Att_{point[k]}$ according to the joint loss $Att_{Aeff}$ to obtain a maximum gain impact factor $A_3$, further comprises:
obtaining a 0 km-equivalent joint loss $Att_{point}$ according to the distance between the joint and the pump source, and obtaining a 0 km-equivalent joint loss $Att_{coefficient}$ according to the fiber loss coefficient;
obtaining a total joint loss Pointloss of the transmission line by using out-of-band ASE, the total joint loss Pointloss being also recorded as $Att_{Toal}$;
calculating a 0 km-equivalent joint loss $Att_{Aeff}$ caused by the mode field diameter in the current fiber transmission line according to $Att_{Aeff}=Att_{Toal}-Att_{point}-Att_{coefficient}$; and
looking up the relationship between the maximum Raman gain and the joint loss $Att_{Aeff[k]}$ according to the joint loss $Att_{Aeff}$ to obtain the maximum gain impact factor $A_3$.

12. The apparatus of claim 11, characterized in that obtaining a total joint loss Pointloss of the transmission line by using out-of-band ASE, further comprises:
obtaining out-of-band ASE power $ASE_{out-of-band}$, and calculating the total joint loss Pointloss according to a formula $Att_{total}=(ASE_{out-of-band}-k*P_{pump}-b)/(k+1)$, where $ASE_{out-of-band}$ is detected out-of-band ASE power, $P_{pump}$ is pump power for calculating the joint loss, $Att_{Toal}$ is the total joint loss, k is a tilt of the linear relationship, and b is an intercept of the straight line.

13. The apparatus of claim 10, characterized in that the relationship between the maximum Raman gain and the joint loss $Att_{point[i]}$, the relationship between the maximum Raman gain and the joint loss $Att_{coefficient[j]}$, and the relationship between the maximum Raman gain and the joint loss $Att_{Aeff[l]}$, further comprises:
calculating an actual maximum gain value according to each loss value $Att_{point[i]}$, and dividing the actual maximum gain value by a calibrated maximum gain value to obtain a corresponding impact factor; establishing a relationship between each loss value $Att_{point[i]}$ and the corresponding impact factor;
calculating an actual maximum gain value according to each loss value $Att_{coefficient[j]}$, and dividing the actual maximum gain value by the calibrated maximum gain value to obtain a corresponding impact factor; establishing a relationship between each loss value $Att_{coefficient[j]}$ and the corresponding impact factor; and
calculating an actual maximum gain value according to each loss value $Att_{Aeff[l]}$, and dividing the actual maximum gain value by the calibrated maximum gain value to obtain a corresponding impact factor; establishing a relationship between each loss value $Att_{Aeff[l]}$ and the corresponding impact factor.

14. The apparatus of claim 10, characterized in that determining the maximum gain $G_{max\_factual}$ which the Raman fiber amplifier can actually achieve according to the impact factors $A_1$, $A_2$, $A_3$, and $A_4$, further comprises:

calculating an equivalent impact factor A by a formula A=A1*A2*A3*A4 according to the impact factors $A_1$, $A_2$, $A_3$ and $A_4$;

calculating the actual maximum gain value $G_{max\_factual}$ according to a formula $G_{max\_factual}=G_{max\_calibration}*A$, where $G_{max\_calibration}$ calibration is a calibrated maximum gain of the Raman fiber amplifier.

15. The apparatus of claim 14, characterized in that when the Raman fiber amplifier is a distributed Raman fiber amplifier, the calibrated maximum gain $G_{max\_calibration}$ is obtained by the following steps:

establishing a relational expression between a gain tilt and the maximum gain through collecting maximum gain values of the Raman fiber amplifier under various gain tilts in advance;

looking up the relational expression between a gain tilt and the maximum gain according to the gain tilt of the current fiber transmisstion line to obtain the calibrated maximum gain $G_{max\_calibration}$.

16. The apparatus of claim 15, characterized in that establishing a relational expression between a gain tilt and the maximum gain comprises:

when $Tilt<Tilt_{turning\ point}$, $G_{max\_calibration}=k_{01}*Tilt+b_{01}$;

when $Tilt \geq Tilt_{turning\ point}$, $G_{max\_calibration}=k_{02}*Tilt+b_{02}$; and looking up the relational expression between a gain tilt and the maximum gain according to the gain tilt of the current fiber transmission line to obtain the calibrated maximum gain $G_{max\_calibration}$, further comprises:

calculating the calibrated maximum gain $G_{max\_calibration}$ by substituting a Tilt setting value into one corresponding formula of the above two formulas.

17. The apparatus of claim 10, characterized in that the 0 km joint loss $Att_{point[i]}$ equivalent to a joint loss at different positions of one or more types of fibers, further comprises:

the value $Att_{point}$ is obtained by establishing in a control unit a table of 0 km-equivalent joint loss varying with a position in the fibers and then obtaining a 0 km-equivalent joint loss value for a position in the fiber by looking up the table and interpolation.

18. The apparatus of claim 10, characterized in that the 0 km joint loss $Att_{coefficient[j]}$ equivalent to a joint loss caused by a loss coefficient of the fibers, further comprises:

the value $Att_{coefficient}$ is obtained by establishing in a control unit a table of 0 km-equivalent joint loss varying with a calibrated loss coefficient of the fibers and then obtaining a 0 km-equivalent joint loss value for a fiber loss coefficient by looking up the table and interpolation.

* * * * *